United States Patent
Carmichael et al.

(10) Patent No.: US 10,729,151 B2
(45) Date of Patent: Aug. 4, 2020

(54) FOAMING PRESSURIZED BEVERAGE

(71) Applicant: La Colombe Torrefaction, Inc., Philadelphia, PA (US)

(72) Inventors: Todd Carmichael, Gladwyne, PA (US); Patrick Libois, Philadelphia, PA (US); Edward Green, Philadelphia, PA (US)

(*) Notice: Subject to any disclaimer, the term of this patent is extended or adjusted under 35 U.S.C. 154(b) by 170 days.

(21) Appl. No.: 15/571,295

(22) PCT Filed: May 6, 2016

(86) PCT No.: PCT/US2016/031190
§ 371 (c)(1),
(2) Date: Nov. 2, 2017

(87) PCT Pub. No.: WO2016/179483
PCT Pub. Date: Nov. 10, 2016

(65) Prior Publication Data
US 2018/0352824 A1 Dec. 13, 2018

Related U.S. Application Data

(63) Continuation of application No. 14/982,583, filed on Dec. 29, 2015, now Pat. No. 10,051,874.
(Continued)

(51) Int. Cl.
*A23C 9/152* (2006.01)
*A23F 5/24* (2006.01)
(Continued)

(52) U.S. Cl.
CPC .......... *A23C 9/1524* (2013.01); *A23C 9/154* (2013.01); *A23F 5/243* (2013.01); *A23G 1/56* (2013.01);
(Continued)

(58) Field of Classification Search
CPC .......... B65D 81/2046; B65D 81/2053; B65D 85/72; A23C 9/1524; A23C 9/154; B65B 31/06
(Continued)

(56) References Cited

U.S. PATENT DOCUMENTS 1,912,439 A * 6/1933 Feller .................. A23C 9/1524
222/397
2,977,231 A 3/1961 Fox et al.
(Continued)

FOREIGN PATENT DOCUMENTS

EP 1055614 11/2000
EP 1094027 4/2001
(Continued)

OTHER PUBLICATIONS

International Search Report dated Nov. 2, 2016 from International Application No. PCT/US2016/031190.
(Continued)

*Primary Examiner* — Jyoti Chawla
(74) *Attorney, Agent, or Firm* — Stradley Ronon Stevens & Young, LLP

(57) ABSTRACT

A method of making a pressurized packaged liquid beverage. The method includes filling a container including a one-way valve with a liquid beverage, sealing the container, introducing a volume of gas through the one-way valve after sealing the container, and agitating the liquid beverage inside the sealed container, When the container is opened, the liquid beverage increases in volume and separates into liquid phase and a drinkable foam phase. The method may be carried out in a sealed container including a one-way valve adapted to allow a gas to enter the first container but not exit or a circulatory agitation system according to other embodiments. Thee liquid beverage may include milk, coffee, fruit juice, or mixtures thereof, particularly mixtures of
(Continued)

milk and coffee, and may further include a gum. The gas may be nitrous oxide.

8 Claims, 32 Drawing Sheets

Related U.S. Application Data

(60) Provisional application No. 62/313,380, filed on Mar. 25, 2016, provisional application No. 62/157,873, filed on May 6, 2015.

(51) Int. Cl.
  *A23L 2/02* (2006.01)
  *A23G 1/56* (2006.01)
  *A23L 2/54* (2006.01)
  *B65B 31/04* (2006.01)
  *B65D 85/72* (2006.01)
  *A23L 2/40* (2006.01)
  *A23L 2/52* (2006.01)
  *A23C 9/154* (2006.01)
  *B65D 81/20* (2006.01)
  *B65B 31/06* (2006.01)

(52) U.S. Cl.
  CPC .................. *A23L 2/02* (2013.01); *A23L 2/40* (2013.01); *A23L 2/52* (2013.01); *A23L 2/54* (2013.01); *B65B 31/04* (2013.01); *B65B 31/06* (2013.01); *B65D 81/2053* (2013.01); *B65D 85/72* (2013.01); *A23C 2270/10* (2013.01); *A23V 2002/00* (2013.01); *A23V 2200/226* (2013.01); *A23V 2250/10* (2013.01); *A23V 2250/5022* (2013.01); *A23V 2250/5086* (2013.01); *B65B 2220/14* (2013.01)

(58) Field of Classification Search
  USPC ........................................ 426/392, 395, 569
  See application file for complete search history.

(56) References Cited

U.S. PATENT DOCUMENTS

| | | |
|---|---|---|
| 2013/0209649 A1 | 8/2013 | Chanet et al. |
| 2014/0110018 A1 | 4/2014 | Scarvelli |
| 2014/0234514 A1 | 8/2014 | Finley |
| 2014/0239521 A1 | 8/2014 | Ergican et al. |
| 2016/0324176 A1 | 11/2016 | Carmichael et al. |

FOREIGN PATENT DOCUMENTS

| | | |
|---|---|---|
| EP | 2769623 | 8/2014 |
| JP | 11-530920 | 4/1999 |
| JP | 2009-531039 | 9/2009 |
| JP | 2009-278925 | 12/2009 |
| WO | 96/33618 | 10/1996 |
| WO | 98/36671 | 8/1998 |
| WO | 2007/110182 | 10/2007 |
| WO | WO-2012178044 A1 * 12/2012 | ........... B67D 1/0014 |

OTHER PUBLICATIONS

Partial International Search Report dated Sep. 7, 2016 from International Application No. PCT/US2016/031190.
1st Office Action dated Jan. 14, 2020 issued by the Japanese Patent Office.

* cited by examiner

FOAMING PRESSURIZED BEVERAGE

RELATED APPLICATIONS

This application claims the benefit of priority to U.S. Patent Application No. 62/157,873 titled "FOAMING PRESSURIZED BEVERAGE," filed on May 6, 2015, and to U.S. patent application Ser. No. 14/982,583 titled "FOAMING PRESSURIZED BEVERAGE," filed on Dec. 29, 2015, and to U.S. Patent Application No. 62/313,380 titled "CIRCULATORY AGITATION SYSTEM," filed on Mar. 25, 2016, the contents of which are incorporated in this application by reference.

TECHNICAL FIELD

The present invention relates generally to pressurized beverages, and particularly to a pressurized milk and coffee beverage which, when opened, stretches into a texturized/aerated beverage with a silky drinkable foam phase on top of a liquid phase. The invention further relates to a system and method for producing the pressurized beverage in a can. The invention further relates to a system and method for producing the pressurized beverage in a keg.

BACKGROUND

Textured or aerated milk, also sometimes referred to as stretched milk, steamed milk, or milk froth, is a common component of many beverages, particularly professionally prepared coffee beverages, such as lattes and cappuccinos, and milk substitute beverages, such as smoothies. As used herein, milk may refer to any animal milk, such as cow milk, or milk substitutes such as almond milk, soy milk, etc. Milk may also refer to other dairy products such as yogurt. Traditionally, textured milk is produced by inserting a steam wand into a container of milk and then adding steam to warm the milk and introduce air bubbles. Other methods of producing textured milk are known including aerating warm milk with a handheld device such as an immersion blender or even a whisk, though typically with less desirable results.

However, there is currently no suitable method of creating a textured milk beverage that is able to reproduce the effect of properly made textured milk which can be packaged and dispensed from a storage container without requiring the manual or steam aeration described above. Although many products are available purporting to include a canned latte or cappuccino beverage, these products often suffer from any of a number of flaws, including little to no milk texture, or a very short hard and dry foam floating on top. For example, one technique that only produces a dry hard foam is disclosed in International Patent Publication No. WO 1996/33618 and involves supersaturating the milk with a gas, typically a nitrogen oxide ($NO_x$) in a large pressure chamber prior to packaging and then quickly capturing the expanding liquid in a can or bottle. The outcome of this technique is far inferior to the professional-grade aerated texture described above.

Accordingly, it is desirable to provide a new method of packaging a liquid beverage in a storage container which, upon opening, produces a volume of a stable foam without requiring manual aeration or steam.

SUMMARY

Embodiments of the invention include methods of making a pressurized packaged liquid beverage. The method includes filling a container including a one-way valve with a liquid beverage, sealing the container, introducing a volume of gas through the one-way valve after sealing the container, and agitating the liquid beverage inside the sealed container. When the container is opened, the liquid beverage increases in volume and separates into liquid phase and a drinkable foam phase. The liquid beverage may include milk, coffee, fruit juice, or mixtures thereof, particularly a mixture of milk and coffee, and may further include chocolate. The liquid may further include a gum. The gum may be acacia gum, guar gum, locust bean gum, carrageenan, pectin, xanthan gum, or mixtures thereof. Agitating the liquid beverage inside the sealed container may occur simultaneously with introducing the volume of gas. The volume of gas may include nitrous oxide. The foam phase may persist for at least 10 minutes after opening the container. The pressure inside the container after introducing the volume of gas and agitating the container is at least approximately 20 pounds per square inch (psi). The liquid beverage may be fully saturated by with gas after introducing the volume of gas and agitating the container. The container is a can, bottle, keg, or any other suitable container.

Another embodiment of the invention includes a pressurized liquid beverage product. The product includes a sealed container including a one-way valve adapted to allow a gas to enter the first container but not exit, and a liquid beverage contained in the container. The liquid beverage is saturated with a volume of gas and the sealed container is pressurized at a pressure ranging from approximately 20 pounds per square inch (psi) to approximately 60 psi. When the first container is opened, the liquid beverage increases in volume and separates into a liquid phase and a drinkable foam phase. The liquid beverage may include milk, coffee, fruit juice, or mixtures thereof, particularly a mixture of milk and coffee, and may further include chocolate. The liquid may further include a gum. The gum may be acacia gum, guar gum, locust bean gum, carrageenan, pectin, xanthan gum, or mixtures thereof. The volume of gas may include nitrous oxide. The foam phase may persist for at least 10 minutes after opening the container. The container is a can, bottle, keg, or any other suitable container.

Another embodiment of the invention includes a circulatory agitation system for the production of a pressurized beverage. The system includes a gas storage container including an outlet; a beverage storage container including an inlet and an outlet; a pump having an inlet and an outlet; a y-connector having a first inlet, a second inlet, and an outlet; a first conduit connecting the outlet of the gas storage container to the first inlet of a y connector; a second conduit connecting the outlet of the y-connector to the inlet of the beverage container; a third conduit connecting the outlet of the beverage container to the inlet of the pump; and a fourth conduit connects the outlet of the pump to the second inlet of the y-connector. The beverage storage container may contain a liquid beverage, and operating the pump causes liquid to circulate between the beverage storage container and the pump. The system may further include a valve and a pressure regulator adapted to control flow of gas between the gas storage container and the y-connector. Gas flowing from the gas storage container may mix in the y-connector with the liquid beverage circulating between the beverage storage container and the pump, resulting in gas dissolving in the liquid beverage. The system may further include an electronic control system which controls the operation of the pump and the valve, and may further provide power to the pump and the valve. The system may further include a refrigerator which holds the beverage container and the pump. The gas storage container, the beverage storage container, and the pump may form a sealed system which does not allow gas to escape.

BRIEF DESCRIPTION OF DRAWINGS

The invention is best understood from the following detailed description when read in conjunction with the accompanying drawing. It is emphasized that, according to common practice, the various features of the drawing are not to scale. On the contrary, the various features are arbitrarily expanded or reduced for clarity. Included in the drawing are the following figures.

DETAILED DESCRIPTION

Embodiments of the invention include liquid beverages packaged in a sealed, pressurized container that, when opened, expand in volume before separating into a liquid phase and a stable textured foam phase above the liquid phase. The beverage may include milk or a milk substitute, and may also include coffee. Embodiments further include methods and systems for to achieving the result described above. In one embodiment, the method includes pressurizing the liquid beverage in a can or other container having a one-way valve which allows the liquid beverage to be pressurized inside the can. In another embodiment, the method includes utilizing a circulatory agitation system to pressurize the liquid beverage inside a keg.

Figure 1:
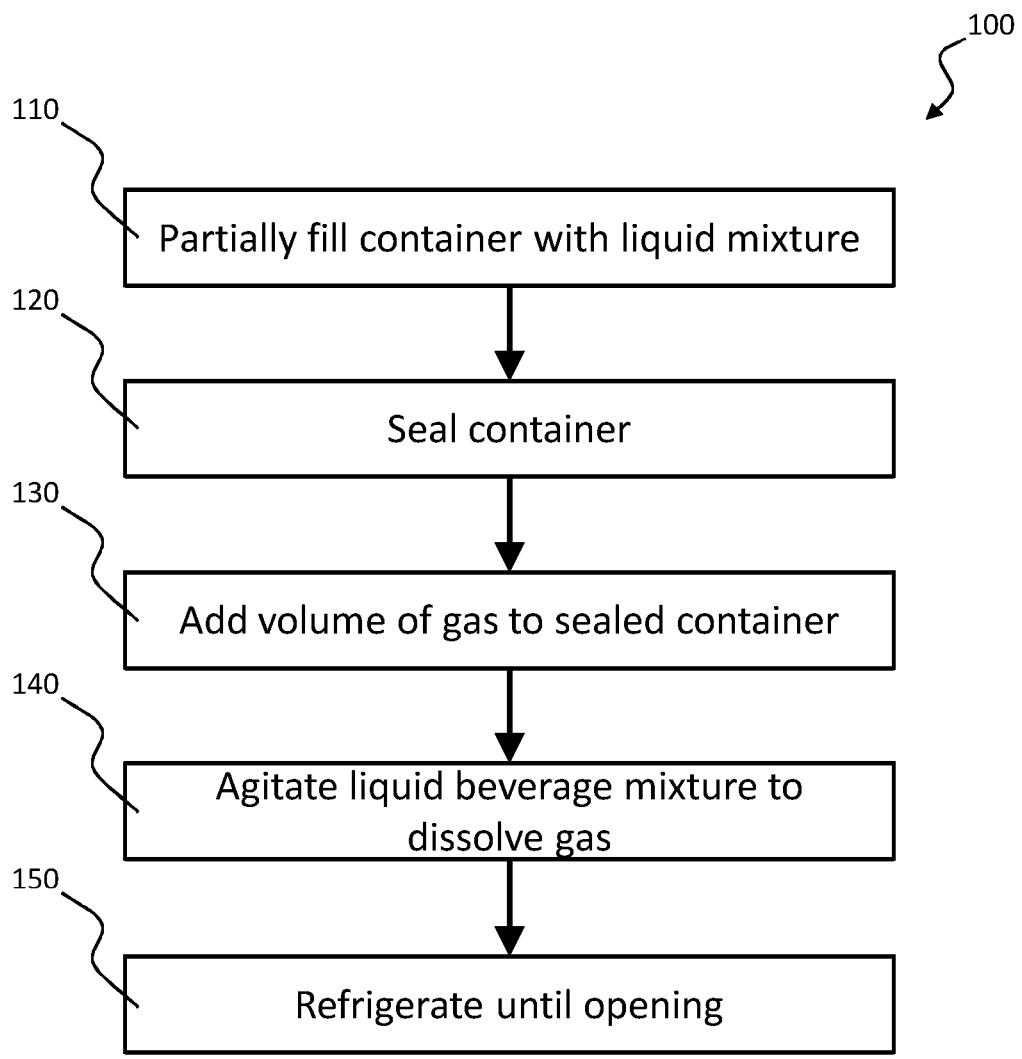
FIG. 1 is a flow chart of a method for producing a pressurized milk beverage, according to an exemplary embodiment of the invention.

Referring now to the drawing, in which like reference numbers refer to like elements throughout the various figures that comprise the drawing, FIG. 1 depicts a method 100 including steps 110-150 for preparing a pressurized beverage. Although the steps are listed in a given order (i.e., first, second, third, etc.), it will be understood that some steps may be performed out of order and that any number of unlisted steps may be included between the steps 110-150 (e.g., the method may include a step between steps 110 and 120 not included in FIG. 1) unless otherwise noted.

At the first step 110 of the method 100, a beverage container is filled with a liquid beverage. The beverage container may be one of any number of vessels suitable for packaging beverages that may be sealed, pressurized with a gas, and reopened as described in more detail below, such as cans, bottles, kegs, etc. In some embodiments, the liquid beverage may include at least a base liquid and a gum. In other embodiments, the gum may not be included. In an exemplary embodiment, the gum is acacia gum (also referred to as gum arabic), guar gum (also referred to as guaran), locust bean gum (also known as carob gum), pectin, xanthan gum, or mixtures thereof. Other gums are also suitable, such as carrageenan. Carrageenan is suspected to be a possible carcinogen, however, and although it will be understood to produce the desired effect in embodiments of the present invention, it is not preferred. The gum may be added to the liquid beverage in a concentration ranging from approximately 0.05 wt. % to approximately 10 wt. %. As described in more detail below, the gum is added as a popping inhibitor which allow bubbles to form and grow into a stable drinkable foam when the beverage container is opened. The preferred amount of gum will depend on the base liquid as well as the desired foam characteristics. Base liquids which are naturally more viscous will require less gum, or in some cases no gum at all, in order to achieve the same effect. The beverage container is only partially filled with the liquid beverage such that a headspace remains above the liquid. In an exemplary embodiment, the volume of the liquid beverage ranges from approximately 65% to approximately 95% of the volume of the beverage container, with the headspace forming the balance of the volume of the beverage container (i.e., approximately 5% to approximately 35% of the volume).

In an exemplary embodiment, the base liquid of the liquid beverage is milk. In some embodiments, "milk" refers to an animal milk including both milk proteins and milk fat, preferably cow's milk. In other embodiments, the milk may be a reconstituted mixture of milk proteins and milk fat. In still other embodiments, the liquid may include one or more milk substitutes such as almond milk, soy milk, etc. These milk substitutes preferable have fat and protein concentrations similar to animal milk. In still other embodiments, the liquid may include other dairy products such as yogurt. The milk used in the liquid beverage may initially have any concentration of fat including approximately 1 wt. % or approximately 2 wt. % (e.g. reduced fat milks), approximately 3.25 wt. % (e.g., whole milk), approximately 10.5 wt. % to approximately 18 wt. % (e.g., "half and half"), or greater than approximately 18 wt. % (e.g., cream).

Non-dairy liquids are also suitable as the base liquid of the liquid beverage, such as water, coffee, or fruit juices (e.g., orange juice). The liquid beverage may further include other compounds such as sweeteners (e.g., sugar, honey, artificial, non-saccharide sweeteners, etc.)) and artificial or natural flavoring agents (e.g., mint, cinnamon, caramel, hazelnut, chocolate, etc.).

In an exemplary embodiment, the liquid beverage is a mixture of milk or milk substitute and coffee in any suitable ratio. The coffee may be brewed using any suitable method known to one of ordinary skill in the art, including, but not limited to, espresso, drip brewing, or cold brewing. In a preferred embodiment, the coffee is cold brewed with a brew strength, measured as the percentage of total dissolved solids ranging of approximately 7 parts per million (ppm). The cold brewed coffee is preferably mixed with whole milk at a milk to coffee weight ratio ranging from approximately 4:1 to approximately 5:1. In other words, the liquid beverage preferably includes approximately 15 wt. % to approximately 25 wt. % of coffee and approximately 80 wt. % to approximately 90 wt. % milk or milk substitute. It will be understood that the sum of the weight percentages for each component of the liquid beverage will not exceed 100%.

The liquid beverage may be prepared by slowly mixing the gum and the base liquid until the gum is well dissolved. The base liquid and gum are preferably mixed at rate low enough to avoid dissolving air into the mixture. Where the base liquid is a mixture of liquids, the gum may be dissolved into a first liquid before a second liquid is added to the mixture. For example, for a mixture of coffee and milk, the gum may first be dissolved in the coffee. The milk is then added to the coffee-gum mixture and again slowly mixed to incorporate without dissolving air in the mixture. In other embodiments, the liquid beverage may be mixed any other order, including first mixing together the milk and the coffee and then adding the gum. In some embodiments, the liquid beverage may be ultrasonicated to remove any dissolved air before or after filling the beverage container, but before sealing the beverage container.

At the second step 120 of the method 100, the beverage container is sealed such that the beverage container forms part of a gas tight system. In one exemplary embodiment, described in more detail below, the beverage container is a circulatory agitation system which includes a keg and a pump, in which the liquid beverage and gas is able travel from the keg and through the pump before returning to the keg. Once sealed, the headspace may contain air at approximately atmospheric pressure (i.e., approximately 14.7 pounds per square inch (psi) at sea level). In another embodiment, the headspace may be purged of air such that the headspace has a reduced pressure of less than atmospheric pressure.

At the third step 130 of the method 100, a volume of a gas is introduced into the beverage container through a one-way valve. The gas is preferably nonreactive to prevent the gas from altering the flavor of the liquid beverage. In an exemplary embodiment, the gas is nitrous oxide ($N_2O$). In contrast to a nonreactive gas like nitrous oxide, carbon dioxide reacts with water to form carbonic acid. Accordingly, carbon dioxide would increase the acidity of the liquid beverage, leading to undesirable flavors or even curdling of the liquid beverage. After the gas is introduced into the first container, it may naturally collect in the headspace rather than being dissolved into the liquid.

At the fourth step 140 of the method 100, the liquid beverage, now sealed in the beverage container is agitated to dissolve a portion of the gas in the liquid beverage. As explained in greater detail below, the liquid beverage may be agitated by agitating the container or by agitating only the liquid beverage within the container. As the gas is dissolved, it will move from the headspace into the liquid beverage, thereby reducing the pressure in the headspace. The gas is added and the beverage container is agitated until the liquid beverage is fully saturated by the gas. Saturation may be determined by measuring the pressure within the headspace. When the pressure in the headspace is not reduced by further agitation, no more gas can be dissolved into the liquid beverage. The gas may be added to the sealed beverage container continuously while agitating the liquid beverage or in a stepwise manner, where gas is added to the container between periods of agitation. Simultaneous addition of gas and agitation is preferred. After the liquid beverage is fully saturated by the gas, the pressure in the beverage container preferably ranges from approximately 20 psi to approximately 60 psi, and more preferably approximately 20 to 40 psi. Without agitation, the gas will collect in the headspace rather than dissolve in the liquid beverage. Because undissolved gas will not form bubbles in the liquid beverage once the beverage container is opened, reducing or eliminating agitation will result in reduced foam production.

Because the amount of the gas which can be dissolved in the liquid beverage is dependent on the temperature of the liquid beverage, steps 130 and 140 preferably occur at the temperature at which the product will be stored and served to prevent too little or too much of the gas being dissolved in the liquid beverage during packaging. More preferably, the liquid beverage has a temperature ranging from approximately 32° F. to approximately 40° F. during filling and pressurizing.

After the liquid beverage is fully saturated, the beverage container may be stored until it is ready to be served. In some embodiments, the beverage container may be refrigerated until serving, preferably at a temperature ranging from approximately 32° F. to approximately 40° F. In some other, the beverage container containing the pressurized liquid beverage may be retorted prior to storage to prevent spoilage. If retorted, refrigeration may not be required provided that the liquid beverage is cooled to approximately 32° F. to approximately 40° F. prior to serving.

The now-pressurized liquid beverage is served by opening the beverage container and pouring the gas-saturated liquid beverage into a second container. Because the gas-saturated liquid beverage will expand in volume once poured out of the beverage, the second container preferably has a greater volume than the amount of the gas-saturated liquid beverage to be poured into it.

Once the gas-saturated liquid beverage is poured into the second container, the dissolved gas in the gas-saturated liquid beverage will begin to exit solution and form bubbles. As the bubbles form, a coating will form around the bubbles and prevent them from popping. If gum is included in the liquid beverage, the coating will include the gum. The gum serves as a popping inhibitor and allows the resulting foam to remain stable for extended period of time. After exiting the solution, the bubbles will continue to expand and increase in volume. As a result, the total volume of the liquid beverage increases and the liquid beverage "stretches" to take up more of the second container. In some cases, at least some of the stretching or expansion may take place in the beverage container after the beverage container is opened and therefore may not be observed in the second container.

As the liquid beverage is "stretched" by the gas expanding inside the bubbles, the bubbles will begin coagulate, such that the liquid beverage separates into a liquid phase and a stable foam phase. Once the liquid beverage has separated, the product is ready to be consumed. The gum in the foam phase strengthens the foam such that it stable for a duration of time. The foam is stable for at least approximately 2 minutes, for at least approximately 5 minutes, for at least approximately 10 minutes, or for at least approximately 30 minutes. In embodiments where the liquid beverage does not include gum, the foam phase will still be present, but will dissipate more quickly. The foam may also remain stable after heating, for example by a microwave oven. Because the liquid beverage forms both a foam phase and a liquid phase, it is ready to be served immediately after separating rather than being mixed with a liquid beverage. Further, because the liquid beverage is saturated with gas only after the beverage container is sealed, a greater volume of the foam phase is formed and the foam has a silky, more desirable texture similar to the professional-grade aerated texture described above. In contrast, if the liquid beverage was saturated with gas prior to packaging, the gas will begin to expand and form bubbles before it can be sealed in the package. As a result, the beverage is not as charged with gas and can only produce the hard, thin foam common to prior art products.

The addition of gum to the base liquid serves at least three purposes. First, it thickens the base liquid in a way that may be more pleasing to drink. Second, once the container is opened, the gum traps the gas that exits the base liquid and forms bubbles. Some base liquids are sufficiently viscous to foam without the addition of gum, but the foam phase duration is greatly increased by the gum. The gum further serves as a limiter on bubble size by forming a stronger, thicker bubble wall which resists stretching by the trapped gas. This results in finer bubbles which are perceived as silkier and creamier than foams with large bubbles. In situations where the resulting beverage will be consumed immediately, the foam phase may persist for a sufficient duration without the addition of gum to the liquid beverage.

Increasing the pressure inside the beverage container produces more foam which persists for a longer period of time by increasing the volume of gas dissolved in the liquid beverage and available to produce bubbles. However, simply adding more gas alone is not sufficient to cause the gas to dissolve. Increasing the agitation time results in large increases in foam volume by causing a substantial increase in the volume of dissolved gas. Absent agitation, the gas injected into the container simply collects in the headspace and escapes the container once opened. Headspace gas cannot be trapped by the bubbles and therefore does not result in foaming. In other words, the amount of dissolved gas in the liquid beverage is dependent on both the pressure inside the container and the degree of agitation. Low pressure, low agitation, or both will result in low amounts of dissolved gas. Increasing the pressure, agitation, or both will increase the amount of dissolved gas until the liquid beverage is saturated.

Accordingly, the production of foam is based on two factors: amount of gum, if used, and volume of dissolved gas. Each bubble can be considered a balloon which is inflated by the dissolved gas, but becomes harder to inflate as the balloon wall becomes thicker as a result of increased gum. Low amounts of dissolved gas results in a lack of foam because there is little gas to be trapped and the liquid lacks the ability to trap whatever gas is available. Low amounts of dissolved gas and high amounts of gum leads to a slow cascading effect, but a low stretch and a weak microfoam. High amounts of dissolved gas and low amounts of gum leads to a dry foam which quickly stretches to large volumes. High amounts of dissolved gas and high amounts of gum lead to a medium stretch and a cascading effect which results in a strong and durable microfoam. However, there are levels beyond which additional gum is not beneficial. Too much gum results in bubble walls which are too thick to be expanded by the dissolved gas, resulting in an overall decrease in the amount of gum. Optimal amounts of gum and dissolved gas will depend on the desired foam properties and the characteristics of the underlying base liquid. For example, base liquids which are more viscous will require lower amounts of gum, or no gum at all, in order to achieve the same effect.

Figure 2:
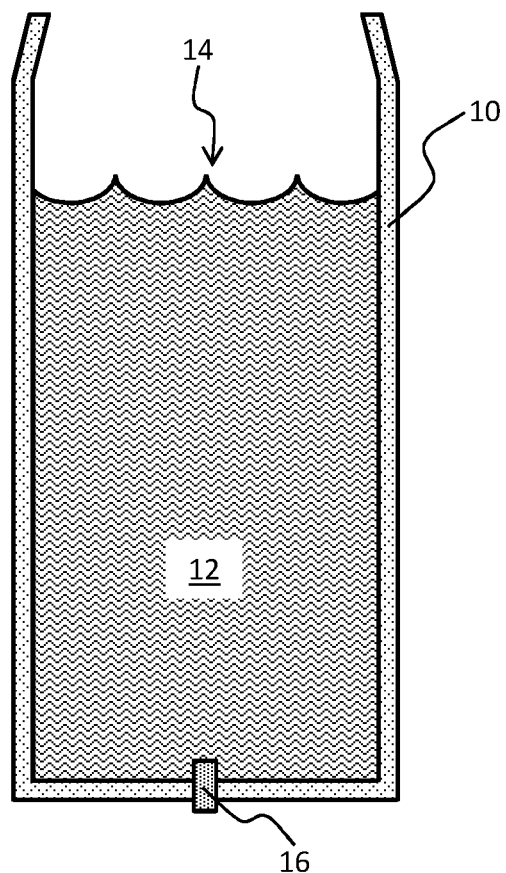
FIG. 2 is a cross-sectional view depicting a first container being filled with a liquid beverage, according to an exemplary embodiment of the invention.

Referring now to FIG. 2, the method 100 may be performed in a first beverage container 10. At the first step 110 of the method 100, a first container 10 is filled with a liquid beverage 12 as described above. The first container 10 may be one of any number of vessels suitable for packaging beverages that may be sealed, pressurized with a gas, and reopened as described in more detail below, such as cans, bottles, kegs, etc. In the exemplary embodiment depicted in FIGS. 2-8, the first container 10 is a metal (e.g., aluminum) can. The first container 10 is adapted to allow gas to be introduced into the first container 10 after it is sealed, for example by including a one-way valve 16. In an exemplary embodiment, the one-way valve 16 is incorporated into the bottom of the first container 10. However, other embodiments may include the one-way valve located in any other suitable location, for example the side of the first container 10 (not shown), or the element used to seal the can (described in more detail below). The one-way valve 16, for example, may be a permeable membrane through which a syringe can be introduced into the interior of the first container 10 but which does not allow gas or liquid to exit the first container 10. The one-way valve 16 is preferably a FDA-approved gassing valve. In other embodiments, any other one-way valve may be used. As explained above, the first container 10 is only partially filled with the liquid beverage 12 such that a headspace 14 remains above the liquid beverage 12.

Figure 3:
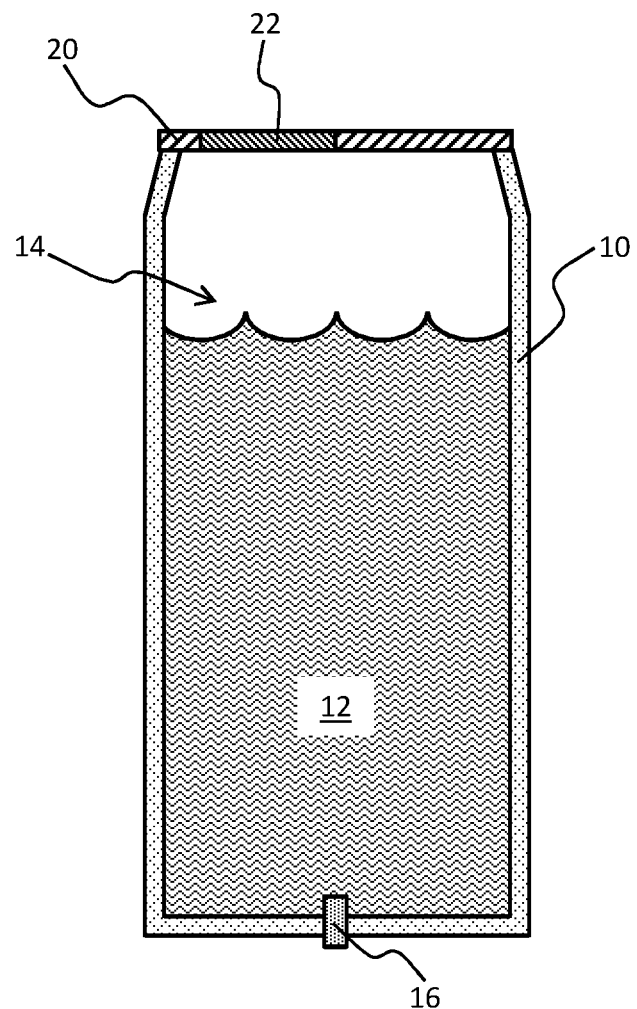
FIG. 3 is a cross-sectional view depicting sealing the first container filled with the liquid beverage, according to an exemplary embodiment of the invention.

Referring now to FIG. 3, at the second step 120 of the method 100, the first container 10 is sealed with a sealing element 20. Once sealed, the first container 10 is preferably adapted to be reopened to allow the liquid beverage 12 to be dispensed from the first container 10, for example by including a scored portion 22 and a pull tab (not shown) which allows the scored portion to be punched out from the sealing element 20. In another embodiment where the first container 10 is a bottle, the sealable element 20 may be a screw cap (not shown) which can be unscrewed to open the first container 10. In some embodiments, the one-way valve 16 may be incorporated into the sealing element 20 rather than the first container 10.

Figure 4:
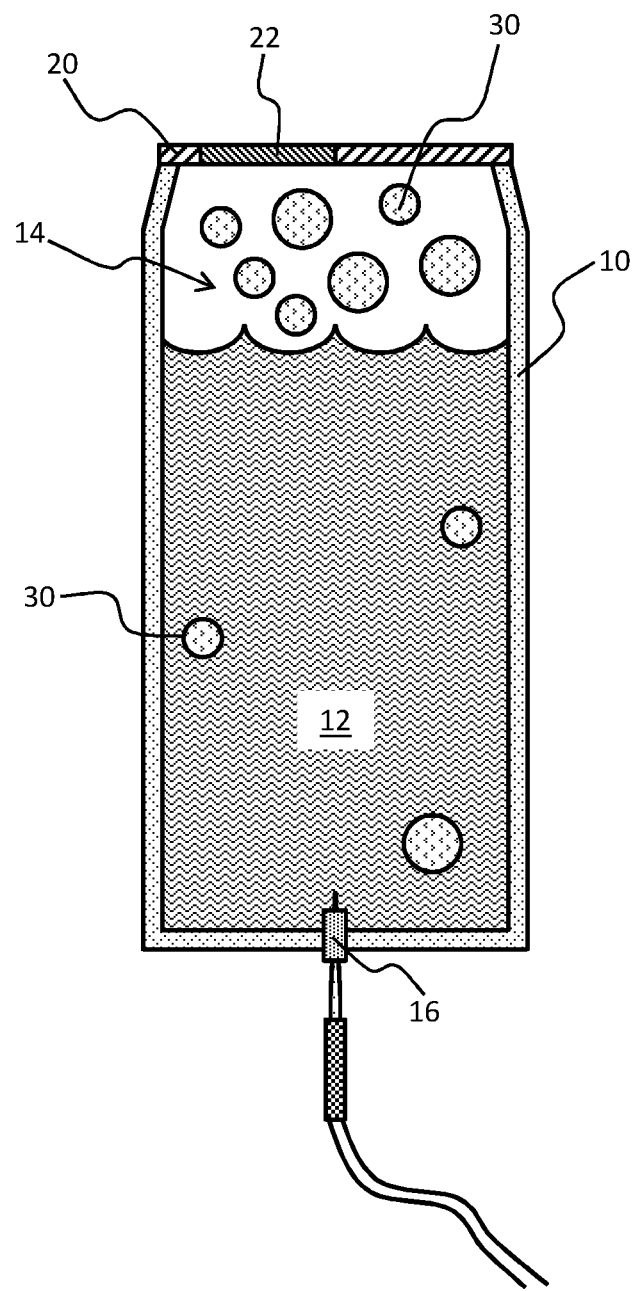
FIG. 4 is a cross-sectional view depicting introducing a volume of a gas into the sealed container, according to an exemplary embodiment of the invention.

Referring now to FIG. 4, at the third step 130 of the method 100, a volume of gas 30 is introduced into the first container 10 through the one-way valve 16. In an exemplary embodiment, the first volume of the gas 30 may be introduced by inserting a syringe 32, a hollow pin, or other gas-dispensing needle through the valve 22 and injecting the gas 30 through the syringe 32 and into the headspace 14. The method of entering the gas into the first container 10 is dependent on the type of valve used and any suitable method may be used accordingly. For example, the one-way valve may be mated to a gas-dispensing valve without requiring a syringe or needle. After the gas 30 is introduced into the first container, it may naturally collect in the headspace 14 rather than being dissolved into the liquid beverage 12.

Figure 5:
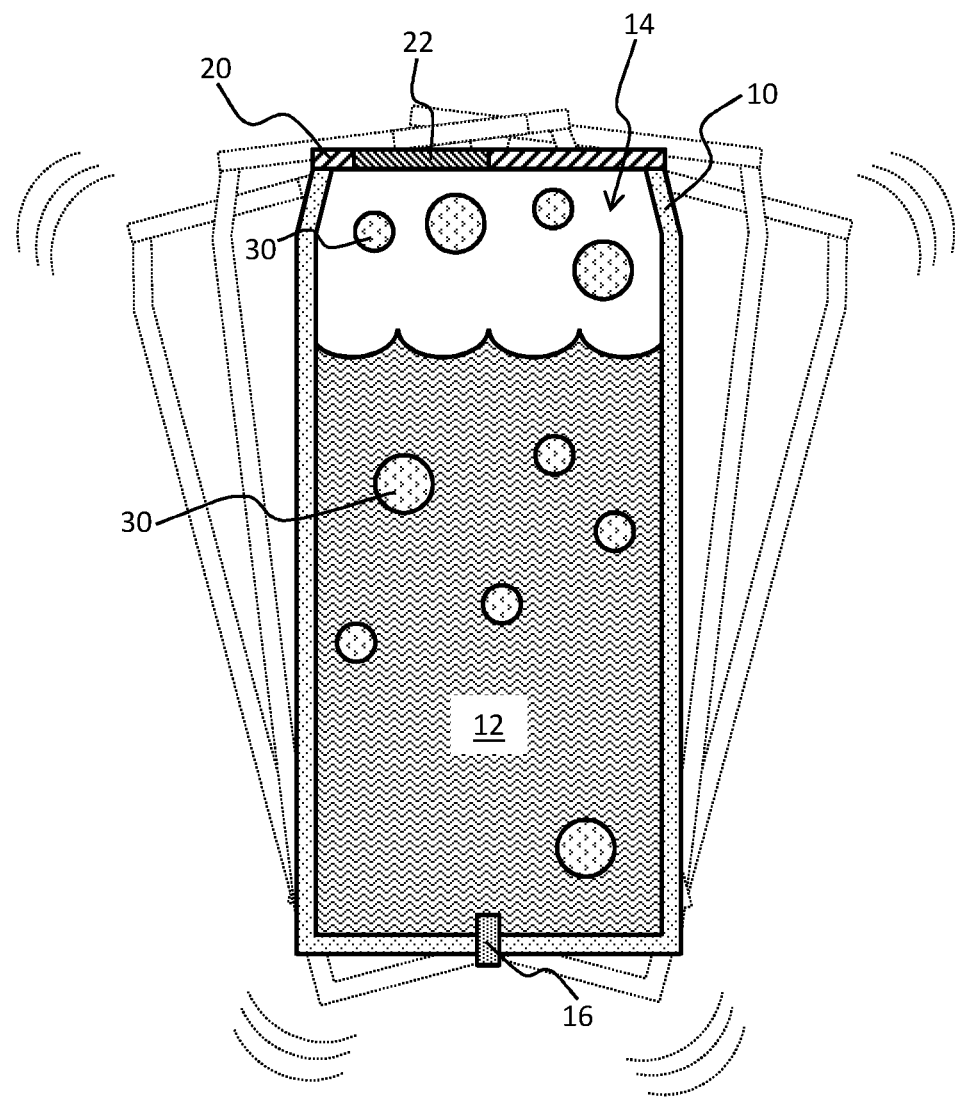
FIG. 5 is a cross-sectional view depicting agitating the sealed container while gas is introduced to dissolve the volume of gas in the liquid beverage, according to an exemplary embodiment of the invention.

Referring now to FIG. 5, at the fourth step 140 of the method 100, the first container 10 is agitated to agitate the liquid beverage 12 and dissolve a portion of the gas 30 in the liquid beverage 12. As the gas 30 moves from the headspace 14 into the liquid beverage 12, the pressure in the headspace 14 will be reduced. The gas is added and the first container 10 is agitated until the liquid beverage 12 is fully saturated. For illustrative purposes the volume of dissolved gas inside the container 10 is depicted in FIGS. 4-5 as large circles. However, it will be understood that the gas is dissolved in the liquid beverage 12 and does not form any substantial amount of bubbles. Although a small number of bubbles may be present, the number of bubbles is substantially less than a process where the liquid beverage 12 is saturated with the gas prior to packaging.

Figure 6:
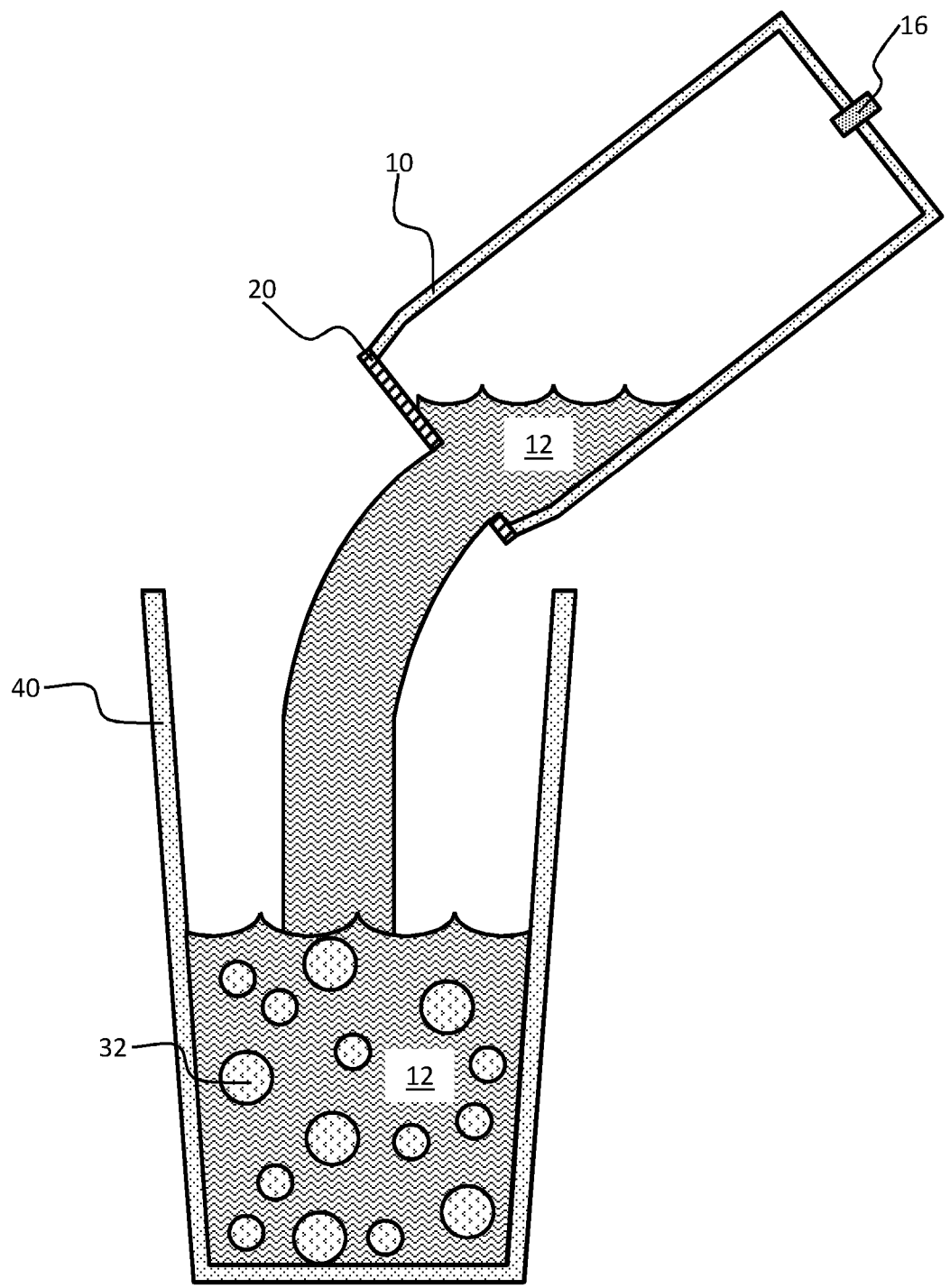
FIG. 6 is a cross-sectional view depicting pouring the gas-saturated beverage from the first container into a second container, according to an exemplary embodiment of the invention.

Referring now to FIG. 6, the pressurized liquid beverage 12 is served by opening the first container 10 and pouring the gas-saturated liquid beverage 12 into a second container 40. Because the gas-saturated liquid beverage 12 will expand in volume once poured out of the first container 10 (described in more detail below), the second container 40 preferably has a greater volume than the amount of the gas-saturated liquid beverage 12 to be poured into it. In another embodiment, the first container 10 may have a volume which is substantially larger than the volume of the liquid beverage 12, so that the expansion of the liquid beverage 12 is contained within the first container 10 once opened.

Figure 7A:
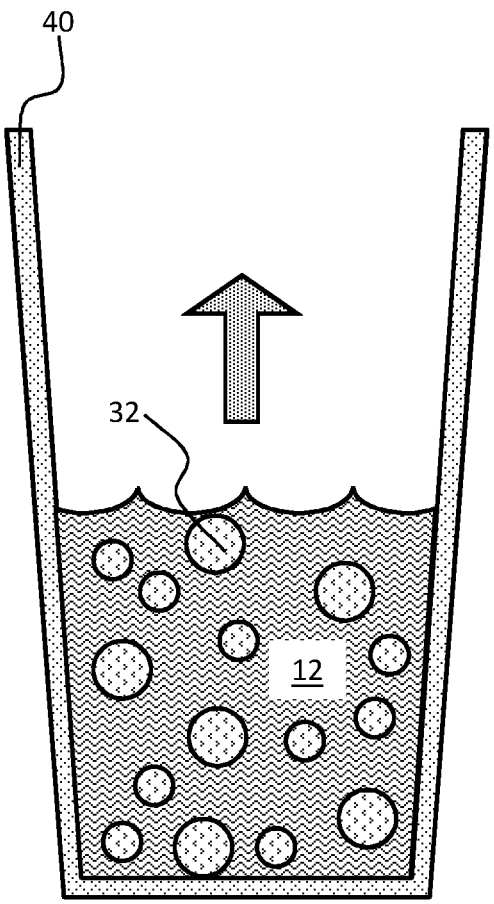
FIG. 7A is a cross-sectional view depicting the gas-saturated beverage after it has been poured into the second container, according to an exemplary embodiment of the invention.
Figure 7B:
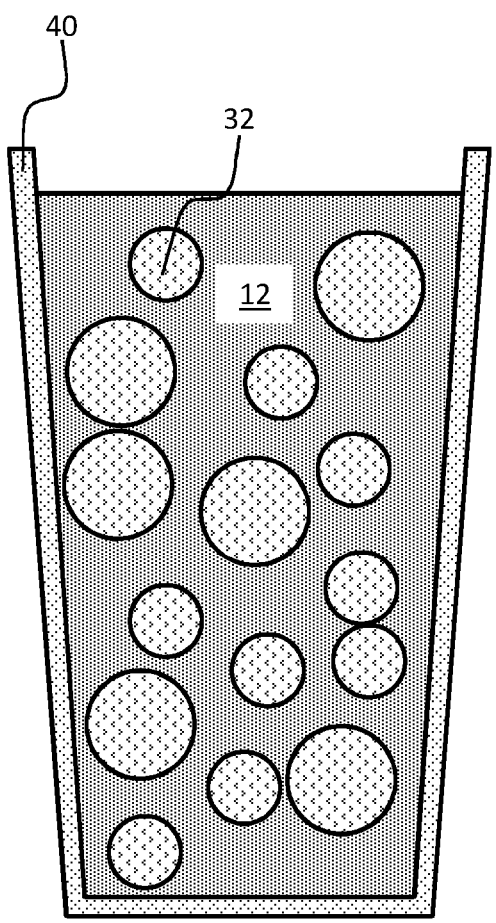
FIG. 7B is a cross-sectional view depicting the gas-saturated beverage expanding to a larger volume, according to an exemplary embodiment of the invention.

Referring now to FIGS. 7A-7B, once the gas-saturated liquid beverage 12 is poured into the second container 40, the dissolved gas 30 in the gas-saturated liquid beverage 12 will begin to exit solution and form bubbles 32, as depicted in FIG. 7A. As explained above, as the bubbles 32 form, a coating including the gum will coat the bubbles 32 and prevent them from popping. As depicted in FIG. 7B, after exiting the solution, the bubbles 32 will continue to expand increase in volume. As a result, the total volume of the liquid beverage 12 increases and the liquid beverage 12 "stretches" to take up more of the second container 40. In some cases, this stretching or expansion may take place in the first container 10 after the first container 10 is opened and therefore may not be observed in the second container 40.

Figure 8:
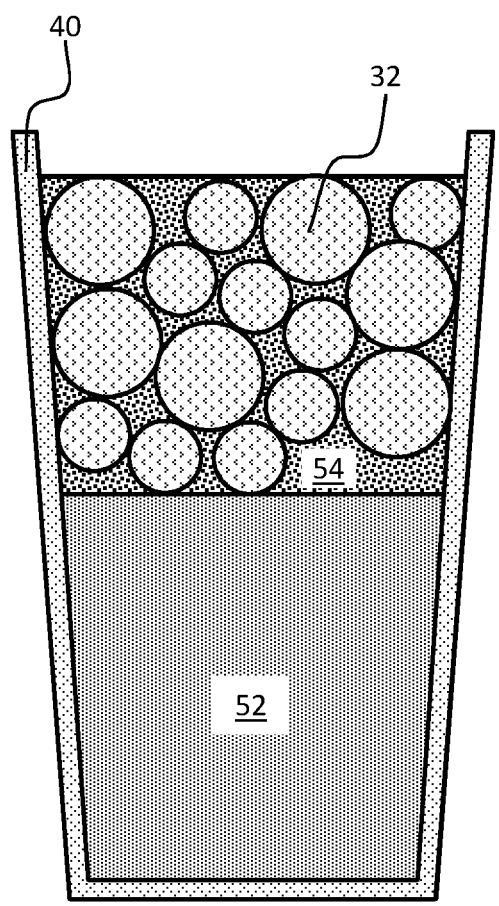
FIG. 8 is a cross-sectional view depicting the gas-saturated beverage separating into a liquid phase and a foam phase, according to an exemplary embodiment of the invention.

Referring now to FIG. 8, as the liquid beverage 12 (FIG. 7B) is "stretched" by the gas expanding inside the bubbles 32, the bubbles 32 will begin coagulate, such that the liquid beverage 12 separates into a liquid phase 52 and a stable foam phase 54. Once the liquid beverage 12 has separated, the product is ready to be consumed.

Figure 9:
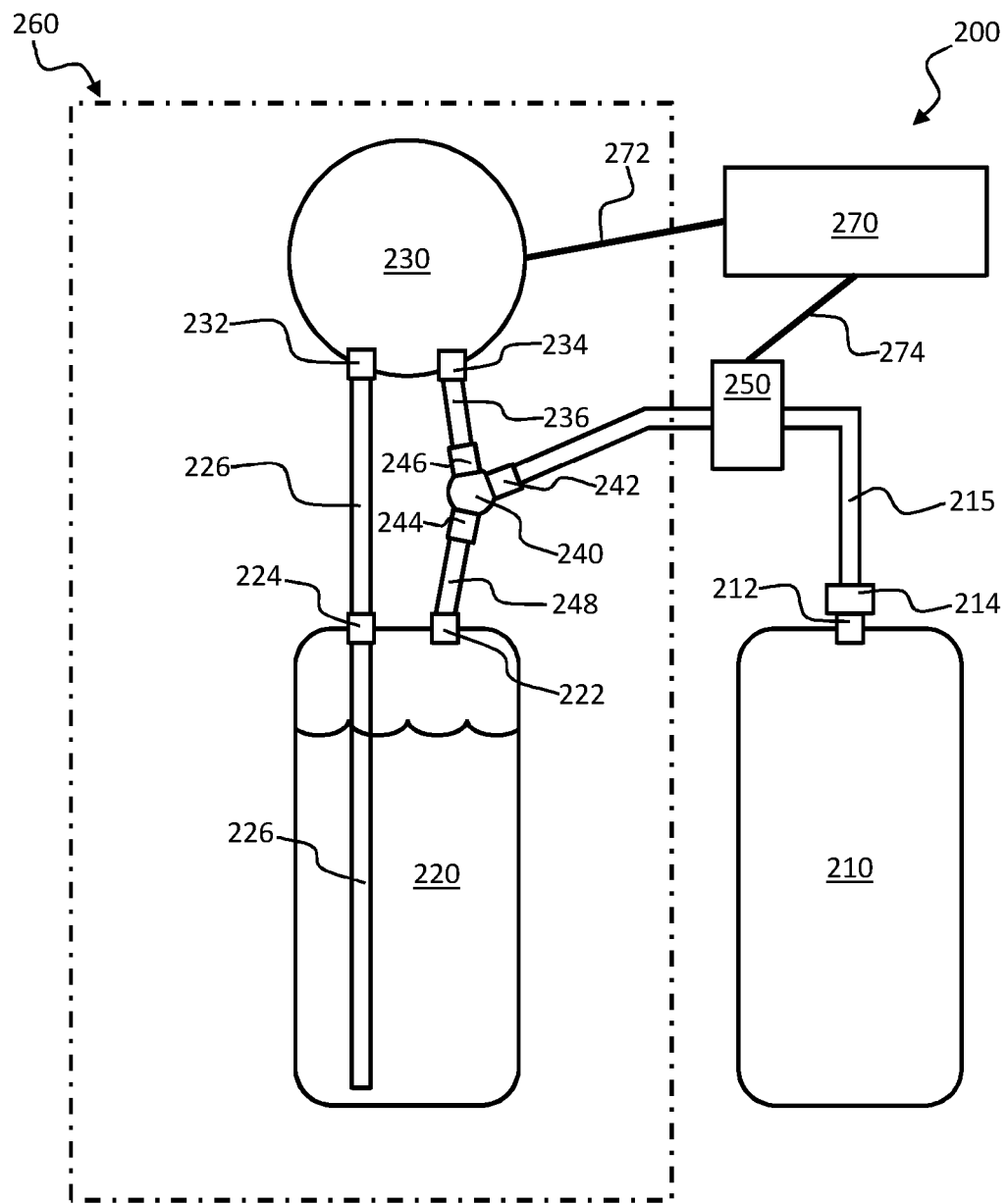
FIG. 9 is a schematic view of a circulatory agitation system, according to an exemplary embodiment of the invention.

Referring now to FIG. 9, in another exemplary embodiment, the method 100 may be carried out using a circulatory agitation system 200. The circulatory agitation system 200 allows for large volumes of the foaming pressurized beverage to be produced for a single location, such as a café, restaurant, etc. The circulatory agitation system 200 permits for agitation of the gassed liquid beverage without requiring agitation of the container the gassed liquid beverage is contained in. The circulatory agitation system 200 includes a gas storage container 210, a beverage storage container 220, and a pump 230. A first conduit 215 connects an outlet port 212 of the gas storage container 210 to a first inlet 242 of a y-connector 240. A valve 250 is located along the first conduit 215 to start and stop the flow of gas from the gas storage container 210 to the y-connector 240. The gas storage container 210 may also include a pressure regulator 214 to control the pressure at which gas exits the gas storage container 210. A second conduit 248 connects an outlet 244 of the y-connector to an inlet 222 of the beverage container 220. A third conduit 226 connects an outlet 224 of the beverage container 220 to an inlet 232 of the pump 230. The beverage container 220 may also include an outlet tube 226. The liquid beverage travels through the outlet tube 226 to exit the beverage container 220 through the outlet 224. A fourth conduit 236 connects an outlet 234 of the pump 230 to a second inlet 246 of the y-connector 240. The inlet 242 and the outlet 244 may be integrated into a single connector, such as a standard keg coupler. Although the valve 250 may be any sort of suitable valve, it is preferably an electromechanically operated valve such as a solenoid valve. Similarly, the pump 230 is also preferably electromechanically operated. All components of the agitation system 200 which contact either the gas or the liquid beverage are preferably food-grade. The circulatory agitation system 200 may also include an electronic control system 270 which controls the operation of the pump 230 and the valve 250 by electrical connections 272 and 274, respectively. The electronic control system may also provide power to the pump 230 and the valve 250, using either manual switches, or a timer-relay or any programmable electric controller. In embodiments where the liquid beverage is perishable, such as milk-based beverages including lattes, the beverage container 220, the pump 230, and any connections between the beverage container 220 and the pump 230 (i.e. the third conduit 226, the fourth conduit 236, the y-connector 240, and the second conduit 248) may be contained inside a refrigerator 260. Because the liquid beverage only circulates between the beverage container 220 and the pump 230, the other components of the circulatory agitation system 200 may optionally be outside the refrigerator 260, as depicted in FIG. 9.

According to step 110 of the method 100 the beverage storage container 220 is filled with the liquid beverage as described above.

According to step 120 of the method 100, once the beverage storage container 220 is filled, it is attached to the gas storage container 210 and the pump 230 via the third conduit 226 and the second conduit 248 as described above. The valve 250 is initially closed to prevent gas from flowing from the gas storage container 210 through the y-connector 240 and into the beverage storage container 220. Once the beverage storage container 220 is attached to the gas storage container 210 and the pump 230, it forms a sealed system. In other words, as described in more detail below, gas is not able to escape the circuit formed by the beverage storage container 220, the gas storage container 210, and the pump 230.

According to steps 130 and 140 of the method 100, the pump 230 is then activated to begin circulating the liquid beverage between the beverage storage container 220 and the pump 230. The circulation between the beverage storage container 220 and the pump 230 results in agitation of the liquid beverage. Once the liquid beverage is circulating between the beverage storage container 220 and the pump 230, the valve 250 is opened to allow gas from the gas storage container 210 to flow into the y-connector 240, where it mixes with the liquid beverage returning to the beverage storage container 220 from the pump 230. If the valve 250 is opened before the pump 230 is activated, the gas pressure in the y-connector 240 may be too great for the liquid beverage to also flow through the y-connector 240 and mix with the gas. Similarly, the pressure in the gas storage container 210 and the flow rate of the liquid beverage must be balanced so that the gas and the liquid beverage are able to merge and mix in the y-connector 240. By opening the valve 250 while the liquid beverage is already circulating through the pump 230, the beverage storage container 220 is slowly pressurized while ensuring that sufficient quantities of gas are dissolved into the liquid beverage. Once the desired pressured inside the beverage storage container 220 is achieved, the valve 250 is closed and the beverage storage container 220 may be disconnected from the third conduit 226 and the second conduit 248.

Figure 10:
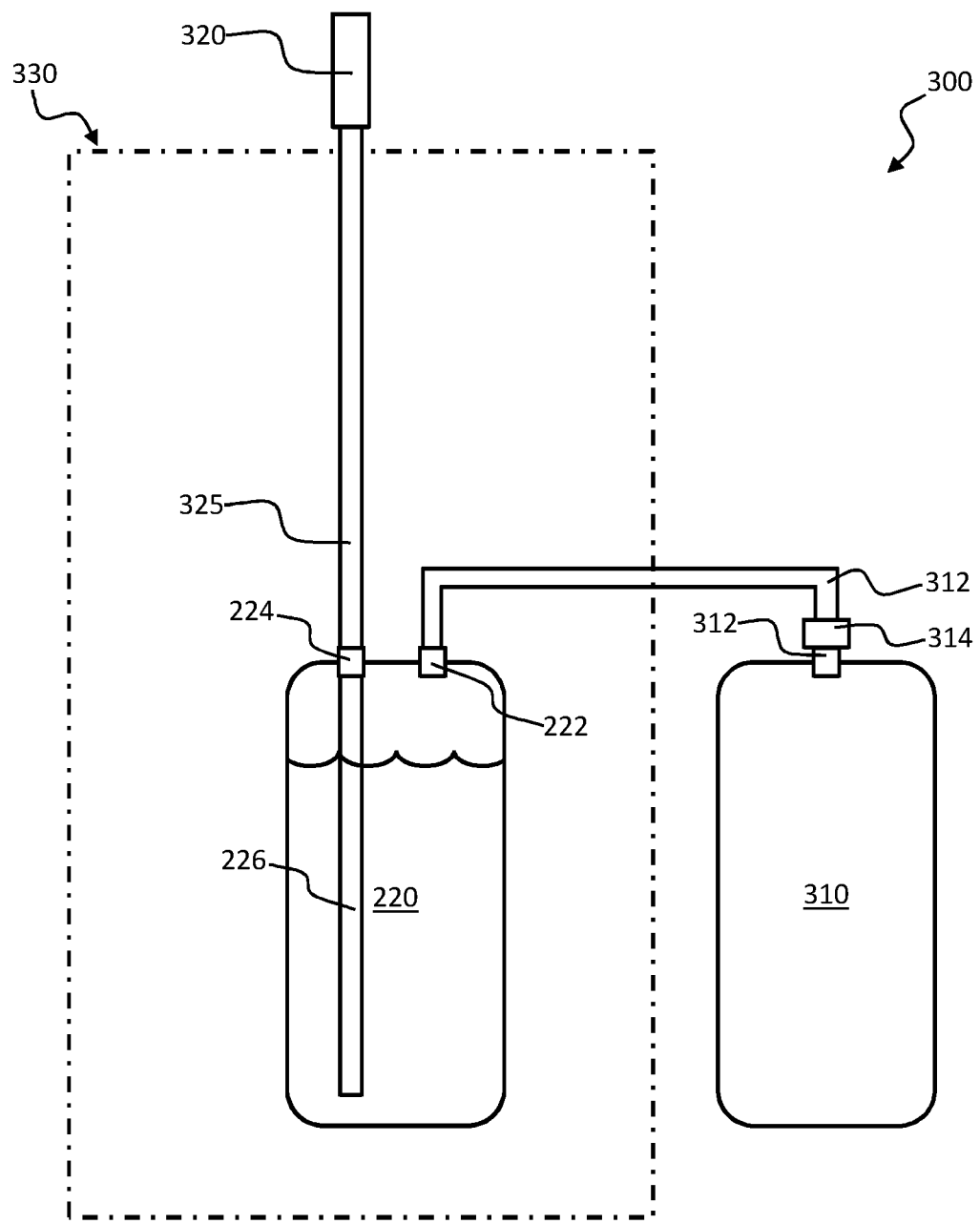
FIG. 10 is a schematic view of a dispensing system, according to an exemplary embodiment of the invention.

To serve the beverage, the beverage storage container 220 is attached to a dispensing system 300, as depicted in FIG. 10. The inlet 222 of the beverage storage container 220 is attached to a second gas storage container 310 by a sixth conduit 312, and the outlet 224 of the gas storage container is attached to a dispensing valve 320 by a seventh conduit 325. The second gas storage container 310 may also include a pressure regulator 314 to control the pressure at which gas exits the second gas storage container 310 The beverage is served by opening the dispensing valve 320 to allow the liquid beverage to exit the beverage storage container 220 and be poured into a serving container as described above. As some of the liquid beverage exits the beverage storage container 220, additional gas flows into the beverage storage container 220 from the second gas storage container 310 to maintain a constant pressure within the beverage storage container 220. In embodiments where the liquid beverage is perishable, such as milk-based beverages including lattes, the beverage container 220 may also be stored in a refrigerator 330 during serving.

Figure 11:
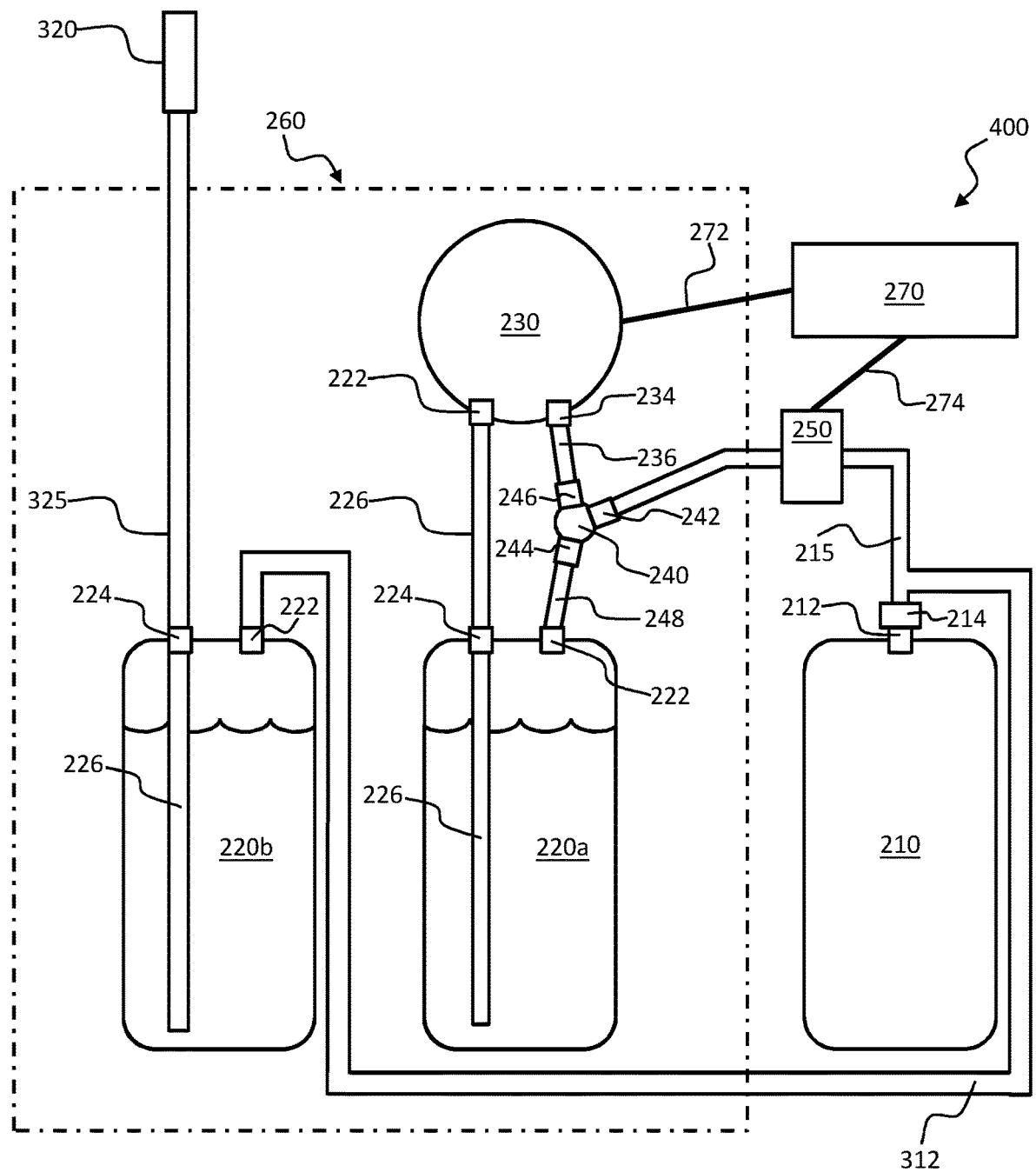
FIG. 11 is a schematic view of a combined circulatory agitation system and dispensing system, according to an exemplary embodiment of the invention.

In some embodiments, the circulatory agitation system 200 and the dispensing system 300 may be combined in a single system 400, as depicted in FIG. 11 to allow a first beverage storage container 220a to be pressurized while a second beverage storage container 220b is being dispensed. In the system 400, the first gas storage container 210 also acts as the second gas storage container 310 and the first beverage storage container 220a and the second beverage storage container 220b are stored in a common refrigerator 260. In other embodiments, the system 400 may be used to only pressurize beverage storage container or dispense the beverage from a beverage storage container at one time. In such embodiments, the system 400 facilitates easier transitioning between pressurizing and dispensing.

The following examples are provided to describe the invention in greater detail. The examples are intended to illustrate, not to limit, the invention.

EXAMPLES

Examples 1-45 below illustrate embodiments of the invention employing a beverage container having a one-way valve, as described above in conjunction with FIGS. 2-8. Example 46 illustrates embodiments of the invention employing a circulatory agitation system, as described above in conjunction with FIGS. 9-11.

In Examples 1-45, various beverages were produced by filling a 9 fluid ounce can including a one-way valve with a base liquid. In some examples, various amounts of two gums were added to the base liquid and fully mixed using a homogenizer from IKA Works, Inc. and a blender from Vita-Mix Corporation. The first gum, referred to below as "Gum A", contains acacia gum and is commercially available from Tic Gums, Inc. as Gum Arabic Spray Dry Powder. The second gum, referred to below as "Gum B" contains a mixture of acacia and xanthan gums and is also commercially available from Tic Gums, Inc. as Ticaloid 210 S Powder. Once the can is filled and sealed, a volume of nitrous oxide gas was introduced into the can through the one-way valve while agitating the can at a frequency of 9 Hz with a gasser-shaker from Gerstung Aerosol, Inc. The gassed can was then refrigerated for at least 15 minutes. The can was then opened and the contents were poured in a streamline flow into a narrow 500 mL beaker. The volume of the liquid phase and the foam phase were then measured over time. Measurements were taken at 0 seconds (i.e., immediately after the beverage is poured into the beaker), 20 seconds, 1 minute, 2 minutes, 5 minutes, 10 minutes, 15 minutes, and 30 minutes. After 30 minutes, it is expected that the beverage would have been consumed and therefore no additional measurements were taken after that time. The viscosity of the liquid phase was measured using a viscometer from Brookfield Engineering Laboratories, Inc. The diameter of the most widespread bubble size was also measured. The maximum volume of "stretch," as described above, was measured as the difference between the volume of liquid added to the can and the greatest combined volumes of the liquid phase and the foam phase.

The above experiment was conducted using six different base liquids: water (Examples 1-7), coffee (Examples 8-14), whole milk (Examples 15-21), latte (i.e., a mixture of coffee and milk) (Examples 22-28), mocha (i.e., a mixture of coffee, milk, cocoa, and sugar) (Examples 29-36), and orange juice (Examples 37-43). For each base liquid, seven different beverages were prepared. The first example for each base liquid had medium levels of gum, pressure, and agitation time. The second and third examples for each base liquid had no gum and increased gum, respectively, but were otherwise identical to the first example. The fourth and fifth examples for each base liquid had decreased and increased pressure, respectively, but were also otherwise identical to the first example. The sixth and seventh examples for each base liquid had decreased and increased agitation times, respectively, but were also otherwise identical to the first example. Additionally, two commercially available packaged coffee beverages were tested. The first commercially available canned coffee beverage, Starbucks Frappuccino (Example 44), is packaged in a glass bottle and contains no dissolved gas. The second, Java Monster from Monster Energy (Example 45), is packaged in a can and is lightly carbonated.

Example 1

Figure 12:
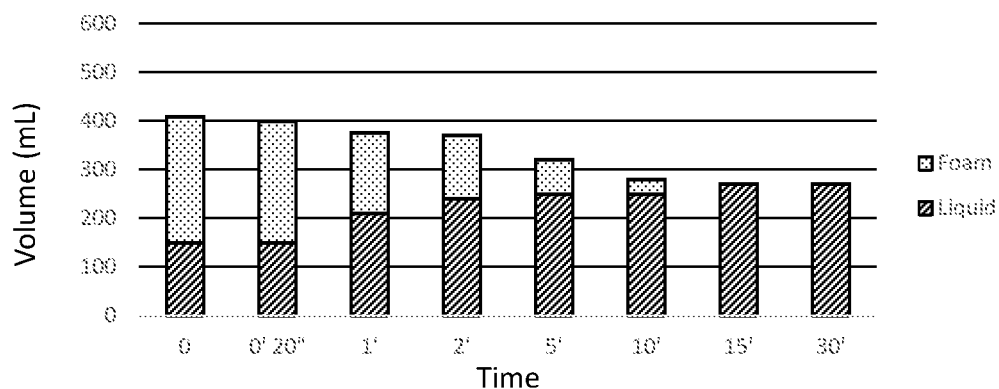
FIGS. 12-56 are graphs depicting the volumes of the foam and liquid phases dispensed from a canned beverage product over time, according to exemplary embodiments of the invention.

In Example 1, 265.5 g of water was mixed with 0.5 g of Gum A and 4.0 g of Gum B and added to a 9 fl. oz. can as described above. Nitrous oxide was added to the can while agitating at 9 Hz for 15 seconds. After gassing and agitating the can, the final pressure inside the can was 50 pounds per square inch (psi). The can was then opened and the beverage poured into the 500 mL beaker. The beverage separated into a liquid phase and a foam phase, which over time dissolved into the liquid phase. The foam phase persisted for 13 minutes before fully disappearing. The volume of the liquid phase and the foam phase over time is indicated below in Table 1. FIG. 12 is a graph of the volumes of the liquid phase and the foam phase of Example 1. The liquid phase had a viscosity of 350 centipoise (cP). The most widespread bubbles in the foam phase had a diameter of 1 mm. The greatest volume of the foam phase was 260 mL, and the beverage stretched to a maximum volume of 140 mL above the initial volume of the beverage.

TABLE 1

Foam Duration of Example 1

| | Time | | | | | | |
|---|---|---|---|---|---|---|---|
| | 0 sec | 20 sec | 1 min | 2 min | 5 min | 10 min | 15 min | 30 min |
| Liquid (mL) | 150 | 150 | 210 | 240 | 250 | 250 | 270 | 270 |
| Foam (mL) | 260 | 250 | 165 | 130 | 70 | 30 | 0 | 0 |

Example 2

Figure 13:
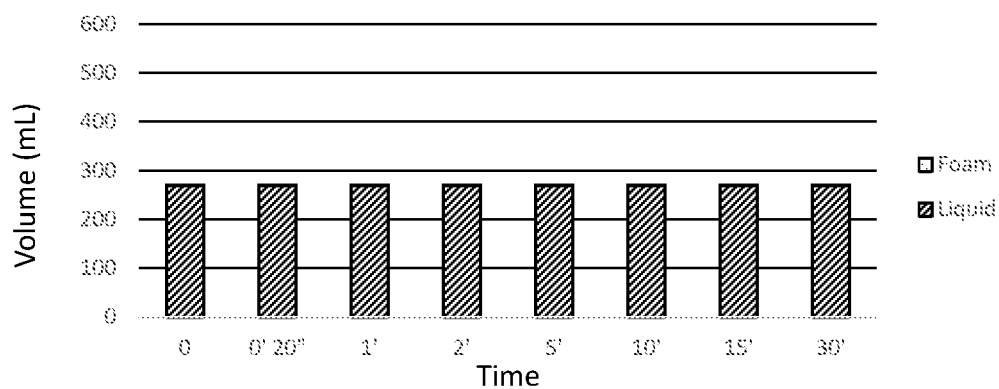

In Example 2, 270.0 g of water was added to a 9 fl. oz. can as described above without the addition of any of Gum A or Gum B. Nitrous oxide was added to the can while agitating for 15 seconds at 9 Hz. After gassing and agitating the can, the final pressure inside the can was 50 psi. The can was then opened and the beverage poured into the 500 mL beaker. No foam phase formed in the beaker, and no amount of stretch was discernible to the naked eye. The volume of the liquid phase over time is indicated below in Table 2. FIG. 13 is a graph of the volumes of the liquid phase of Example 2. The liquid phase had a viscosity of 60 cP.

TABLE 2

Foam Duration of Example 2

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 270 | 270 | 270 | 270 | 270 | 270 | 270 | 270 |
| Foam (mL) | 0 | 0 | 0 | 0 | 0 | 0 | 0 | 0 |

Example 3

Figure 14:
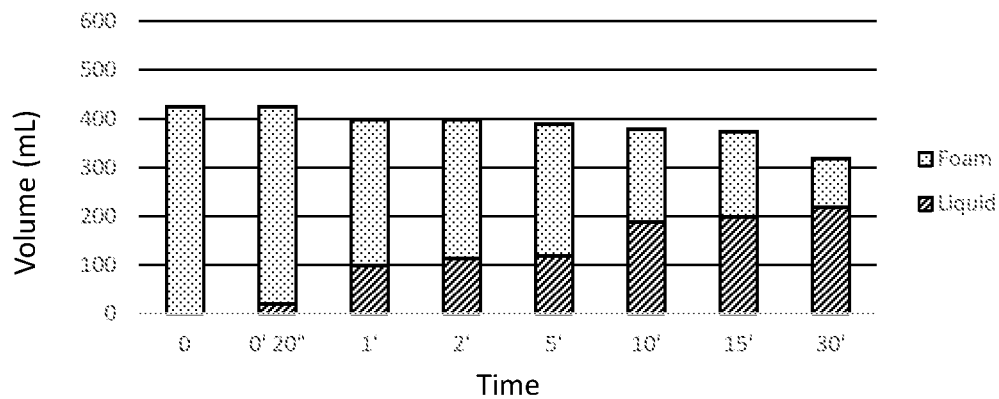

In Example 3, 261.0 g of water was mixed with 1.0 g of Gum A and 8.0 g of Gum B and added to a 9 fl. oz. can as described above. Nitrous oxide was added to the can while agitating for 15 seconds at 9 Hz. After gassing and agitating the can, the final pressure inside the can was 50 psi. The can was then opened and the beverage poured into the 500 mL beaker. The beverage separated into a liquid phase and a foam phase, which persisted for over 30 minutes. The volume of the liquid phase and the foam phase over time is indicated below in Table 3. FIG. 14 is a graph of the volumes of the liquid phase and the foam phase of Example 3. The liquid phase had a viscosity of 920 cP. The most widespread bubbles in the foam phase had a diameter of 0.3 mm. The greatest volume of the foam phase was 425 mL, and the beverage stretched to a maximum volume of 155 mL above the initial volume of the beverage.

TABLE 3

Foam Duration of Example 3

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 20 | 100 | 115 | 120 | 190 | 200 | 220 |
| Foam (mL) | 425 | 405 | 300 | 285 | 270 | 190 | 175 | 100 |

Example 4

Figure 15:
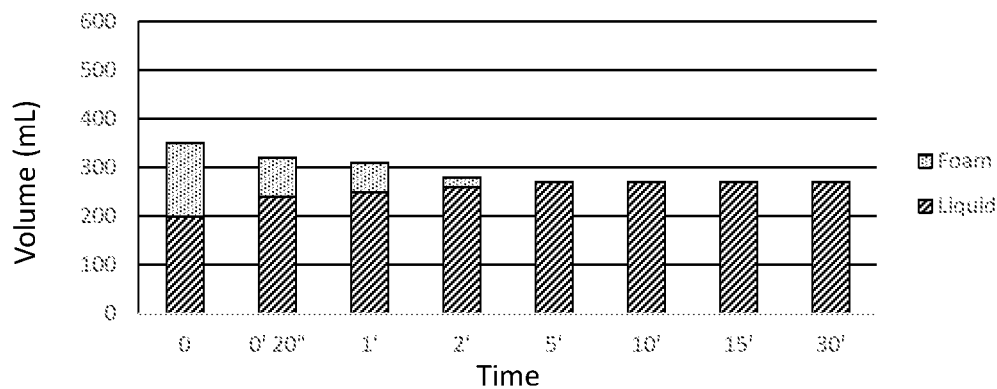

In Example 4, 265.5 g of water was mixed with 0.5 g of Gum A and 4.0 g of Gum B and added to a 9 fl. oz. can as described above. Nitrous oxide was added to the can while agitating for 15 seconds. After gassing and agitating the can, the final pressure inside the can was 20 psi. The can was then opened and the beverage poured into the 500 mL beaker. The beverage separated into a liquid phase and a foam phase, which persisted for 3 minutes. The volume of the liquid phase and the foam phase over time is indicated below in Table 4. FIG. 15 is a graph of the volumes of the liquid phase and the foam phase of Example 4. The liquid phase had a viscosity of 350 centipoise cP. The most widespread bubbles in the foam phase had a diameter of 0.1 mm. The greatest volume of the foam phase was 150 mL, and the beverage stretched to a maximum volume of 80 mL above the initial volume of the beverage.

TABLE 4

Foam Duration of Example 4

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 200 | 240 | 250 | 260 | 270 | 270 | 270 | 270 |
| Foam (mL) | 150 | 80 | 60 | 20 | 0 | 0 | 0 | 0 |

Example 5

Figure 16:
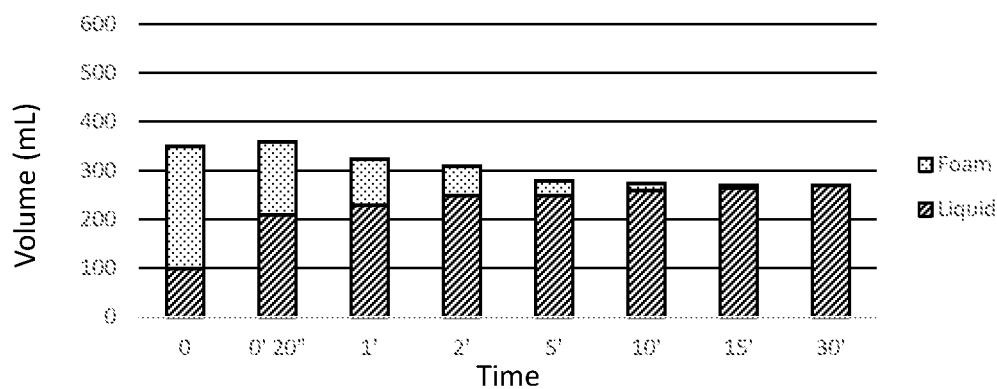

In Example 5, 265.5 g of water was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 70 psi. The can was then opened and the beverage poured into the 500 mL beaker. The beverage separated into a liquid phase and a foam phase, which persisted for 16 minutes. The volume of the liquid phase and the foam phase over time is indicated below in Table 5. FIG. 16 is a graph of the volumes of the liquid phase and the foam phase of Example 5. The liquid phase had a viscosity of 350 centipoise cP. The most widespread bubbles in the foam phase had a diameter of 2.0 mm. The greatest volume of the foam phase was 250 mL, and the beverage stretched to a maximum volume of 90 mL above the initial volume of the beverage.

TABLE 5

Foam Duration of Example 5

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 100 | 210 | 230 | 250 | 250 | 260 | 265 | 270 |
| Foam (mL) | 250 | 150 | 95 | 60 | 30 | 15 | 5 | 0 |

Example 6

Figure 17:
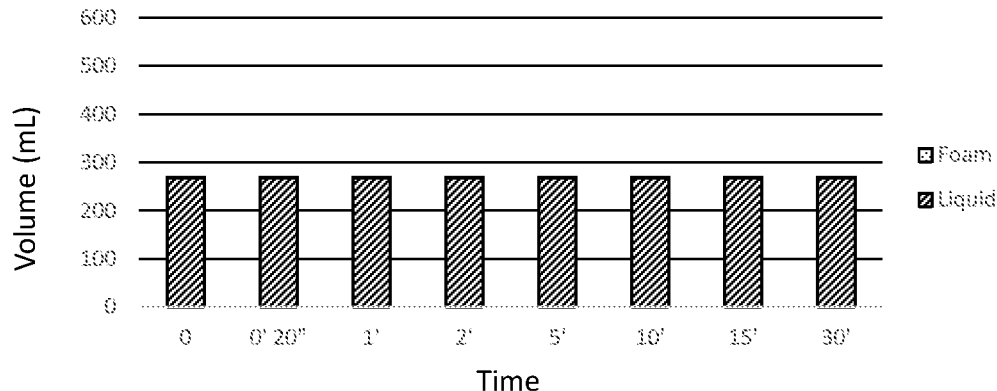

In Example 6, 265.5 g of water was mixed with 0.5 g of Gum A and 4.0 g of Gum B and added to a 9 fl. oz. can as described above. Nitrous oxide was added to the can while agitating for 2 seconds. After gassing and agitating the can, the final pressure inside the can was 50 psi. The can was then opened and the beverage poured into the 500 mL beaker. No foam phase formed in the beaker. The volume of the liquid phase over time is indicated below in Table 6. FIG. 17 is a graph of the volumes of the liquid phase and the foam phase of Example 6. The liquid phase had a viscosity of 350 cP.

TABLE 6

Foam Duration of Example 6

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 270 | 270 | 270 | 270 | 270 | 270 | 270 | 270 |
| Foam (mL) | 0 | 0 | 0 | 0 | 0 | 0 | 0 | 0 |

Example 7

Figure 18:
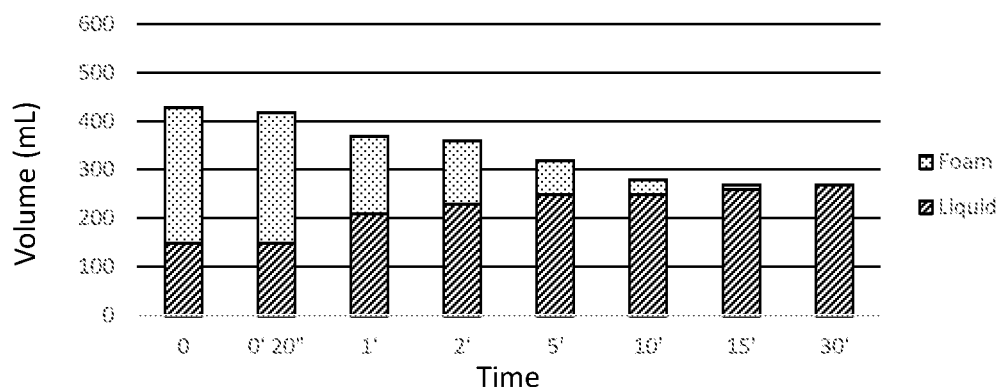

In Example 7, 265.5 g of water was mixed with 0.5 g of Gum A and 4.0 g of Gum B and added to a 9 fl. oz. can as described above. Nitrous oxide was added to the can while agitating for 30 seconds at 9 Hz. After gassing and agitating the can, the final pressure inside the can was 50 psi. The can was then opened and the beverage poured into the 500 mL beaker. The beverage separated into a liquid phase and a foam phase, which persisted for 18 minutes. The volume of the liquid phase and the foam phase over time is indicated below in Table 7. FIG. 18 is a graph of the volumes of the liquid phase and the foam phase of Example 7. The liquid phase had a viscosity of 350 centipoise cP. The most widespread bubbles in the foam phase had a diameter of 1.0 mm. The greatest volume of the foam phase was 280 mL, and the beverage stretched to a maximum volume of 160 mL above the initial volume of the beverage.

TABLE 7

Foam Duration of Example 7

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 150 | 150 | 210 | 230 | 250 | 250 | 260 | 270 |

TABLE 7-continued

Foam Duration of Example 7

| | Time | | | | | | | |
|---|---|---|---|---|---|---|---|---|
| | 0 sec | 20 sec | 1 min | 2 min | 5 min | 10 min | 15 min | 30 min |
| Foam (mL) | 280 | 270 | 160 | 130 | 70 | 30 | 10 | 0 |

Example 8

Figure 19:
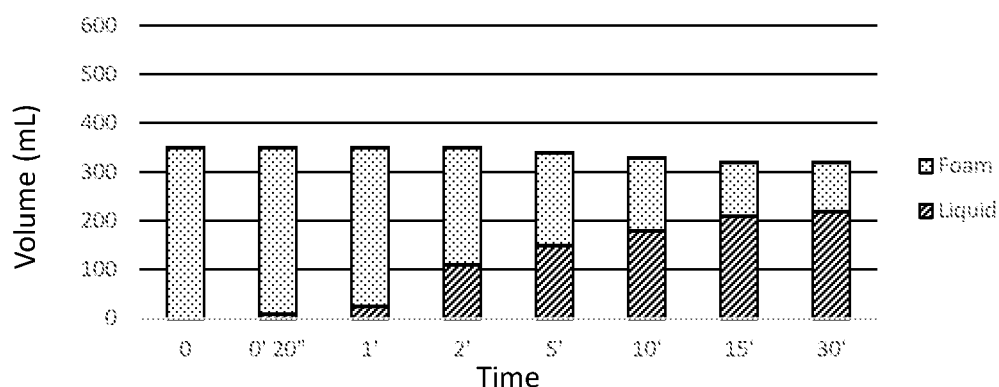

In Example 8, 265.5 g of coffee was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for more than 30 minutes. The volume of the liquid phase and the foam phase over time is indicated below in Table 8. FIG. 19 is a graph of the volumes of the liquid phase and the foam phase of Example 8. The liquid phase had a viscosity of 1620 centipoise cP. The most widespread bubbles in the foam phase had a diameter of 0.2 mm. The greatest volume of the foam phase was 350 mL, and the beverage stretched to a maximum volume of 80 mL above the initial volume of the beverage.

TABLE 8

Foam Duration of Example 8

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 10 | 25 | 110 | 150 | 180 | 210 | 220 |
| Foam (mL) | 350 | 340 | 325 | 240 | 190 | 150 | 110 | 100 |

Example 9

Figure 20:
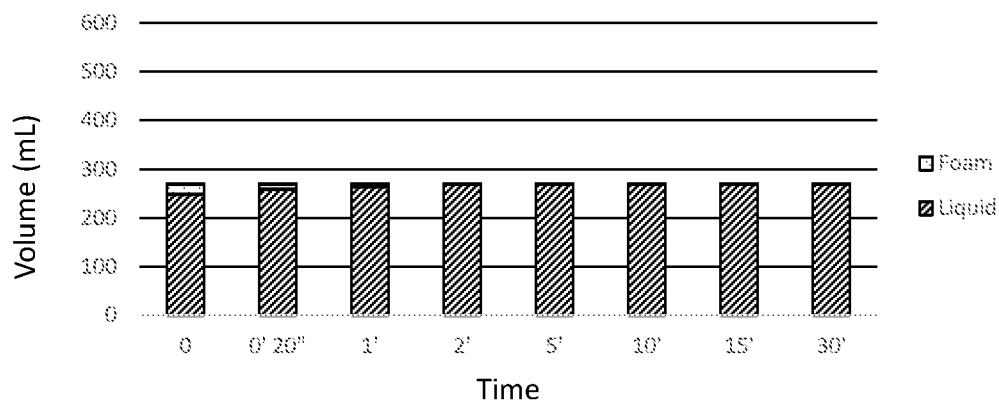

In Example 9, 270.0 g of coffee was added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for only 2 minutes. The volume of the liquid phase and the foam phase over time is indicated below in Table 9. FIG. 20 is a graph of the volumes of the liquid phase and the foam phase of Example 9. The liquid phase had a viscosity of 90 cP. The most widespread bubbles in the foam phase had a diameter of 2.0 mm. The greatest volume of the foam phase was 20 mL, and no amount of stretch was discernible to the naked eye.

TABLE 9

Foam Duration of Example 9

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 250 | 260 | 265 | 270 | 270 | 270 | 270 | 270 |
| Foam (mL) | 20 | 10 | 5 | 0 | 0 | 0 | 0 | 0 |

Example 10

Figure 21:
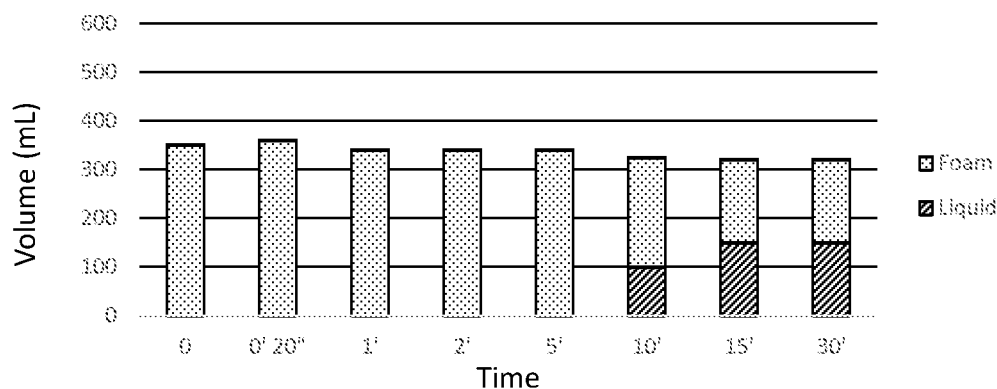

In Example 10, 261.0 g of coffee was mixed with 1.0 g of Gum A and 8.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 10. FIG. 21 is a graph of the volumes of the liquid phase and the foam phase of Example 10. The liquid phase had a viscosity of 5479 cP. The most widespread bubbles in the foam phase had a diameter of 2.0 mm. The greatest volume of the foam phase was 360 mL, and the beverage stretched to a maximum volume of 90 mL above the initial volume of the beverage.

TABLE 10

Foam Duration of Example 10

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 0 | 0 | 100 | 150 | 150 |
| Foam (mL) | 350 | 360 | 340 | 340 | 340 | 225 | 170 | 170 |

Example 11

Figure 22:
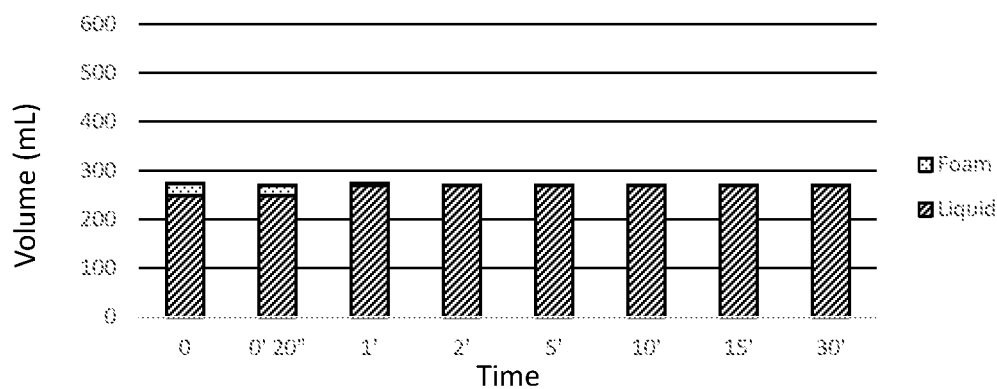

In Example 11, 265.5 g of coffee was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 20 psi. The can was then opened and the beverage poured into the 500 mL beaker. The beverage separated into a liquid phase and a foam phase, which persisted for only 1 minute. The volume of the liquid phase and the foam phase over time is indicated below in Table 11. FIG. 22 is a graph of the volumes of the liquid phase and the foam phase of Example 11. The liquid phase had a viscosity of 1620 cP. The most widespread bubbles in the foam phase had a diameter of 0.05 mm. The greatest volume of the foam phase was 25 mL, and the beverage stretched to a maximum volume of 5 mL above the initial volume of the beverage.

TABLE 11

Foam Duration of Example 11

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 250 | 250 | 270 | 270 | 270 | 270 | 270 | 270 |
| Foam (mL) | 25 | 20 | 5 | 0 | 0 | 0 | 0 | 0 |

Example 12

Figure 23:
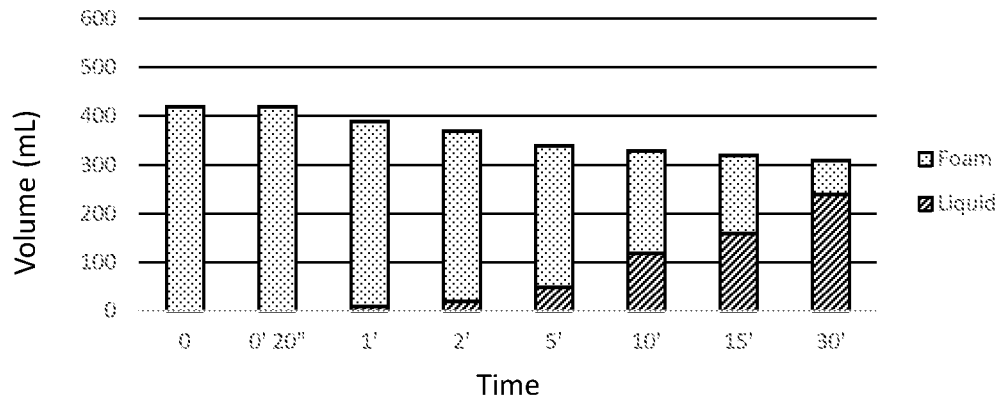

In Example 12, 265.5 g of coffee was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 65 psi. The can was then opened and the beverage poured into the 500 mL beaker. The beverage separated into a liquid phase and a foam phase, which persisted for over 30 minutes. The volume of the liquid phase and the foam phase over time is indicated below in Table 12. FIG. 23 is a graph of the volumes of the liquid phase and the foam phase of Example 12. The liquid phase had a viscosity of 1620 cP. The most widespread bubbles in the foam phase had a diameter of 2.0 mm. The greatest volume of the foam phase was 420 mL, and the beverage stretched to a maximum volume of 150 mL above the initial volume of the beverage.

TABLE 12

Foam Duration of Example 12

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 10 | 20 | 50 | 120 | 160 | 240 |
| Foam (mL) | 420 | 420 | 380 | 350 | 290 | 210 | 160 | 70 |

Example 13

Figure 24:
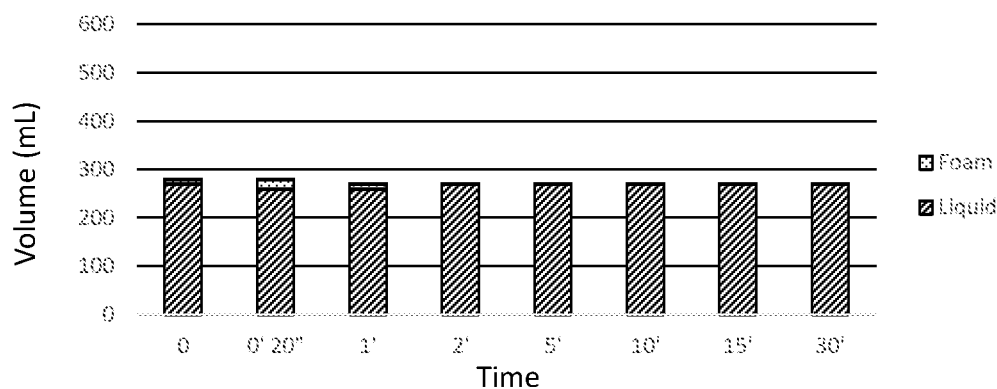

In Example 13, 265.5 g of coffee was mixed with 0.5 g of Gum A and 4.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. The beverage separated into a liquid phase and a foam phase, which persisted for only 1 minute. The volume of the liquid phase and the foam phase over time is indicated below in Table 13. FIG. 24 is a graph of the volumes of the liquid phase and the foam phase of Example 13. The liquid phase had a viscosity of 1620 cP. The most widespread bubbles in the foam phase had a diameter of 0.05 mm. The greatest volume of the foam phase was 20 mL, and the beverage stretched to a maximum volume of 10 mL above the initial volume of the beverage.

TABLE 13

Foam Duration of Example 13

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 270 | 260 | 260 | 270 | 270 | 270 | 270 | 270 |
| Foam (mL) | 10 | 20 | 10 | 0 | 0 | 0 | 0 | 0 |

Example 14

Figure 25:
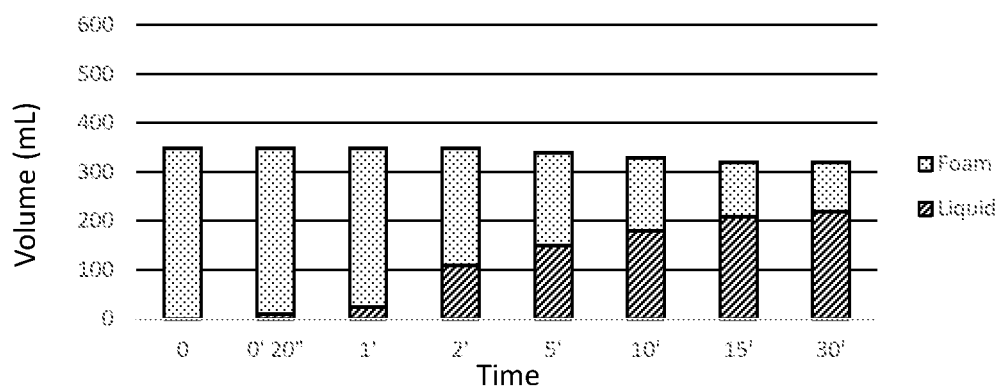

In Example 14, 265.5 g of coffee was mixed with 0.5 g of Gum A and 4.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 14. FIG. 25 is a graph of the volumes of the liquid phase and the foam phase of Example 14. The liquid phase had a viscosity of 1620 cP. The most widespread bubbles in the foam phase had a diameter of 2.0 mm. The greatest volume of the foam phase was 350 mL, and the beverage stretched to a maximum volume of 80 mL above the initial volume of the beverage.

TABLE 14

Foam Duration of Example 14

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 10 | 25 | 110 | 150 | 180 | 210 | 220 |
| Foam (mL) | 350 | 340 | 325 | 240 | 190 | 150 | 110 | 100 |

Example 15

Figure 26:
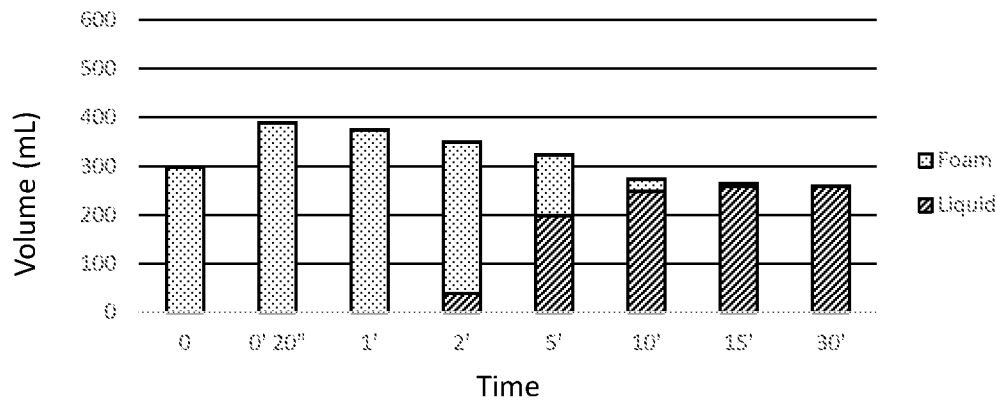

In Example 15, 266.6 g of whole milk was mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 23 minutes. The volume of the liquid phase and the foam phase over time is indicated below in Table 15. FIG. 26 is a graph of the volumes of the liquid phase and the foam phase of Example 15. The liquid phase had a viscosity of 360 cP. The most widespread bubbles in the foam phase had a diameter of 0.1 mm. The greatest volume of the foam phase was 390 mL, and the beverage stretched to a maximum volume of 120 mL above the initial volume of the beverage.

TABLE 15

Foam Duration of Example 15

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 40 | 200 | 250 | 260 | 260 |
| Foam (mL) | 300 | 390 | 375 | 310 | 125 | 25 | 5 | 0 |

Example 16

Figure 27:
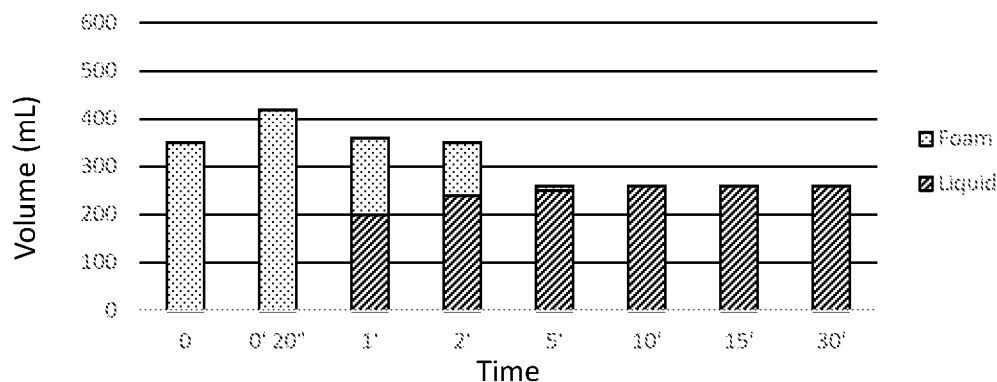

In Example 16, 270.0 g of whole milk was added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 6 minutes. The volume of the liquid phase and the foam phase over time is indicated below in Table 16. FIG. 27 is a graph of the volumes of the liquid phase and the foam phase of Example 16. The liquid phase had a viscosity of 80 cP. The most widespread bubbles in the foam phase had a diameter of 0.15 mm. The greatest volume of the foam phase was 420 mL, and the beverage stretched to a maximum volume of 150 mL above the initial volume of the beverage.

TABLE 16

Foam Duration of Example 16

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 200 | 240 | 250 | 260 | 260 | 260 |
| Foam (mL) | 350 | 420 | 160 | 110 | 10 | 0 | 0 | 0 |

Example 17

Figure 28:
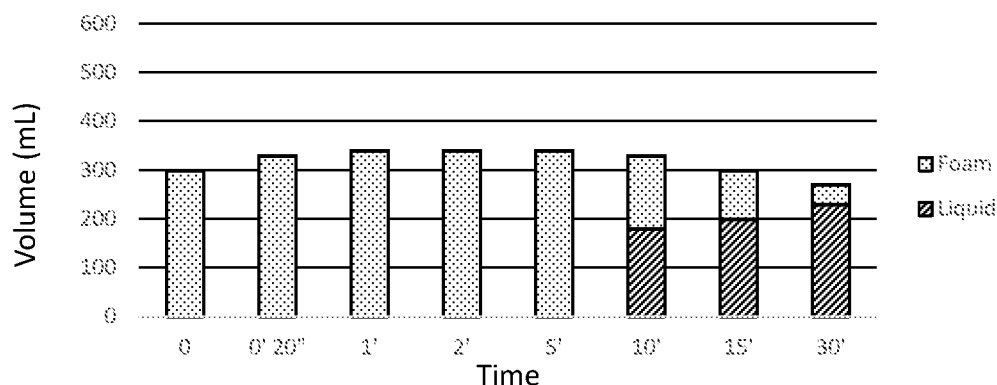

In Example 17, 263.2 g of whole milk was mixed with 0.8 g of Gum A and 6.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 17. FIG. 28 is a graph of the volumes of the liquid phase and the foam phase of Example 17. The liquid phase had a viscosity of 1150 cP. The most widespread bubbles in the foam phase had a diameter of 0.075 mm. The greatest volume of the foam phase was 340 mL, and the beverage stretched to a maximum volume of 70 mL above the initial volume of the beverage.

TABLE 17

Foam Duration of Example 17

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 0 | 0 | 180 | 200 | 230 |
| Foam (mL) | 300 | 330 | 340 | 340 | 340 | 150 | 100 | 40 |

Example 18

Figure 29:
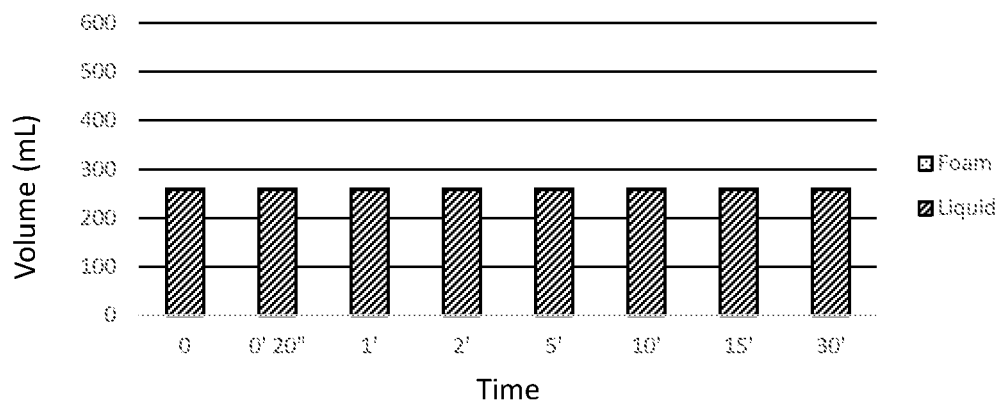

In Example 18, 266.6 g of whole milk was mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 10 psi. The can was then opened and the beverage poured into the 500 mL beaker. No foam phase formed in the beaker, and no amount of stretch was discernible to the naked eye. The volume of the liquid phase over time is indicated below in Table 18. FIG. 29 is a graph of the volumes of the liquid phase of Example 18. The liquid phase had a viscosity of 360 cP.

TABLE 18

Foam Duration of Example 18

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 260 | 260 | 260 | 260 | 260 | 260 | 260 | 260 |
| Foam (mL) | 0 | 0 | 0 | 0 | 0 | 0 | 0 | 0 |

Example 19

Figure 30:
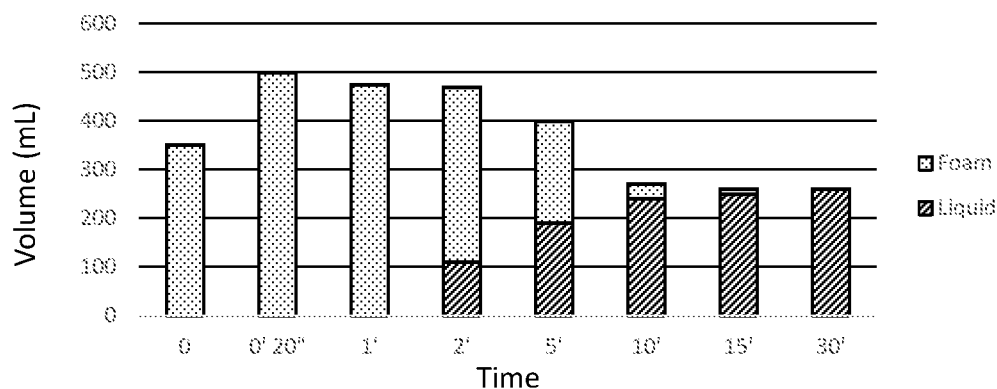

In Example 19, 266.6 g of whole milk was mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for 21 minutes. The volume of the liquid phase and the foam phase over time is indicated below in Table 19. FIG. 30 is a graph of the volumes of the liquid phase and the foam phase of Example 19. The liquid phase had a viscosity of 360 cP. The most widespread bubbles in the foam phase had a diameter of 0.5 mm. The greatest volume of the foam phase was 500 mL, and the beverage stretched to a maximum volume of 230 mL above the initial volume of the beverage.

TABLE 19

Foam Duration of Example 19

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 110 | 190 | 240 | 250 | 260 |
| Foam (mL) | 350 | 500 | 475 | 360 | 210 | 30 | 10 | 0 |

Example 20

Figure 31:
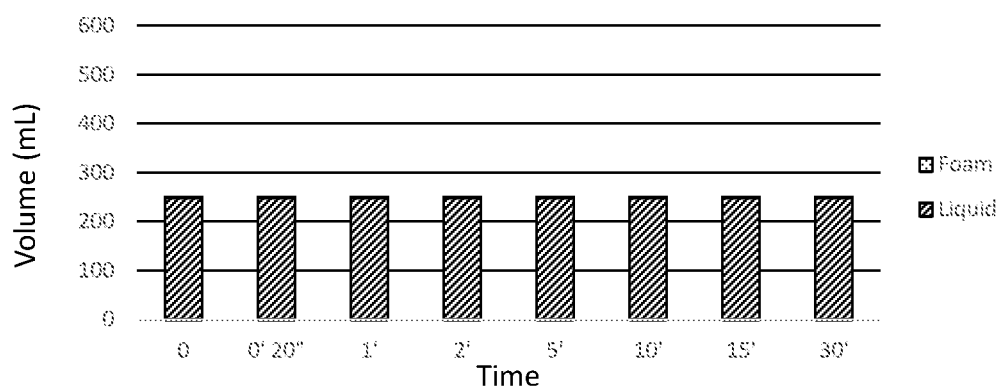
Figure 32:
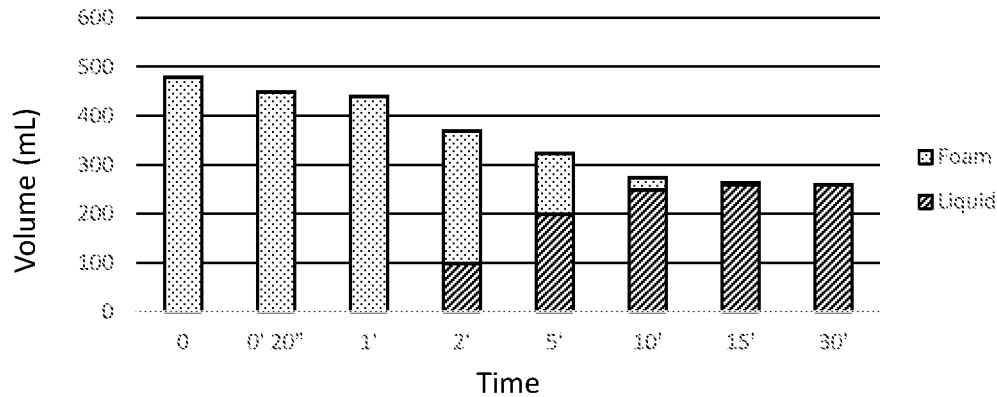

In Example 20, 266.6 g of whole milk was mixed with 0.4 g of Gum A and 3.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. No foam phase formed in the beaker, and no amount of stretch was discernible to the naked eye. The volume of the liquid phase over time is indicated below in Table 20. FIG. 31 is a graph of the volumes of the liquid phase of Example 20. The liquid phase had a viscosity of 360 cP.

TABLE 20

Foam Duration of Example 20

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 250 | 250 | 250 | 250 | 250 | 250 | 250 | 250 |
| Foam (mL) | 0 | 0 | 0 | 0 | 0 | 0 | 0 | 0 |

Example 21

In Example 21, 266.6 g of whole milk was mixed with 0.4 g of Gum A and 3.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for 22 minutes. The volume of the liquid phase and the foam phase over time is indicated below in Table 21. FIG. 29 is a graph of the volumes of the liquid phase and the foam phase of Example 32. The liquid phase had a viscosity of 360 cP. The most widespread bubbles in the foam phase had a diameter of 0.1 mm. The greatest volume of the foam phase was 480 mL, and the beverage stretched to a maximum volume of 210 mL above the initial volume of the beverage.

TABLE 21

Foam Duration of Example 21

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 100 | 200 | 250 | 260 | 260 |
| Foam (mL) | 480 | 450 | 440 | 270 | 125 | 25 | 5 | 0 |

Example 22

Figure 33:
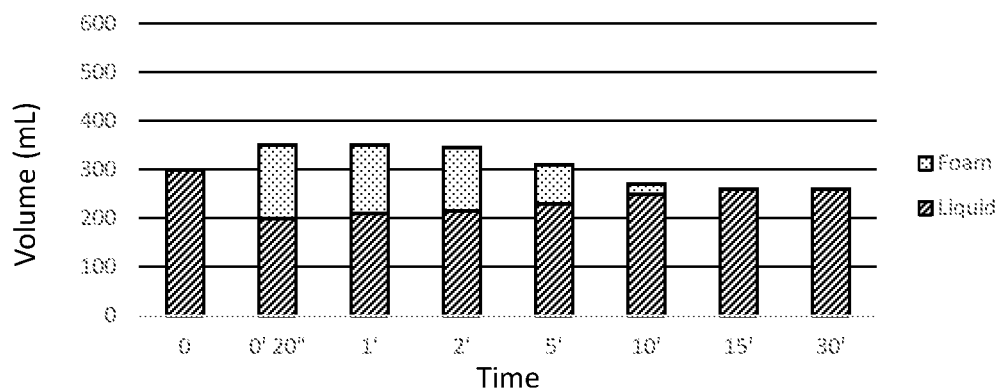

In Example 22, 230.6 g of whole milk and 36.0 g of coffee were mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 14 minutes. The volume of the liquid phase and the foam phase over time is indicated below in Table 22. FIG. 33 is a graph of the volumes of the liquid phase and the foam phase of Example 22. The liquid phase had a viscosity of 750 cP. The most widespread bubbles in the foam phase had a diameter of 0.1 mm. The greatest volume of the foam phase was 150 mL, and the beverage stretched to a maximum volume of 80 mL above the initial volume of the beverage.

TABLE 22

Foam Duration of Example 22

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 300 | 200 | 210 | 215 | 230 | 250 | 260 | 260 |
| Foam (mL) | 0 | 150 | 140 | 130 | 80 | 20 | 0 | 0 |

Example 23

Figure 34:
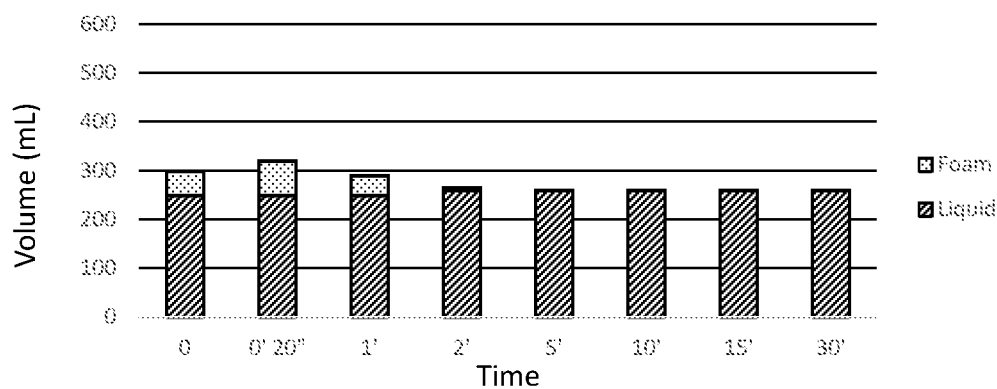

In Example 23, 233.0 g of whole milk and 37.0 g of coffee were added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for only 3 minutes. The volume of the liquid phase and the foam phase over time is indicated below in Table 23. FIG. 34 is a graph of the volumes of the liquid phase and the foam phase of Example 23. The liquid phase had a viscosity of 120 cP. The most widespread bubbles in the foam phase had a diameter of 0.1 mm. The greatest volume of the foam phase was 70 mL, and the beverage stretched to a maximum volume of 50 mL above the initial volume of the beverage.

TABLE 23

Foam Duration of Example 23

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 250 | 250 | 250 | 260 | 260 | 260 | 260 | 260 |
| Foam (mL) | 50 | 70 | 40 | 5 | 0 | 0 | 0 | 0 |

Example 24

Figure 35:
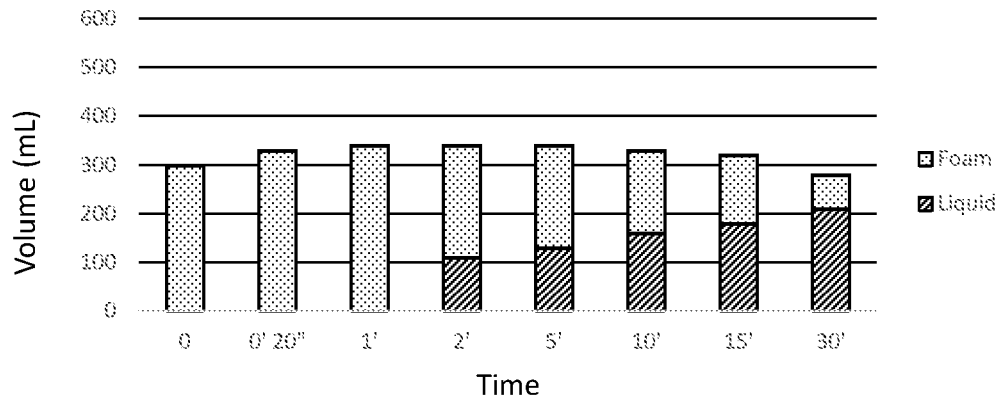

In Example 24, 228.2 g of whole milk and 35.0 g of coffee were mixed with 0.8 g of Gum A and 6.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 24. FIG. 35 is a graph of the volumes of the liquid phase and the foam phase of Example 24. The liquid phase had a viscosity of 2539 cP. The most widespread bubbles in the foam phase had a diameter of 0.05 mm. The greatest volume of the foam phase was 340 mL, and the beverage stretched to a maximum volume of 70 mL above the initial volume of the beverage.

TABLE 24

Foam Duration of Example 24

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 110 | 130 | 160 | 180 | 210 |
| Foam (mL) | 300 | 330 | 340 | 230 | 210 | 170 | 140 | 70 |

Example 25

Figure 36:
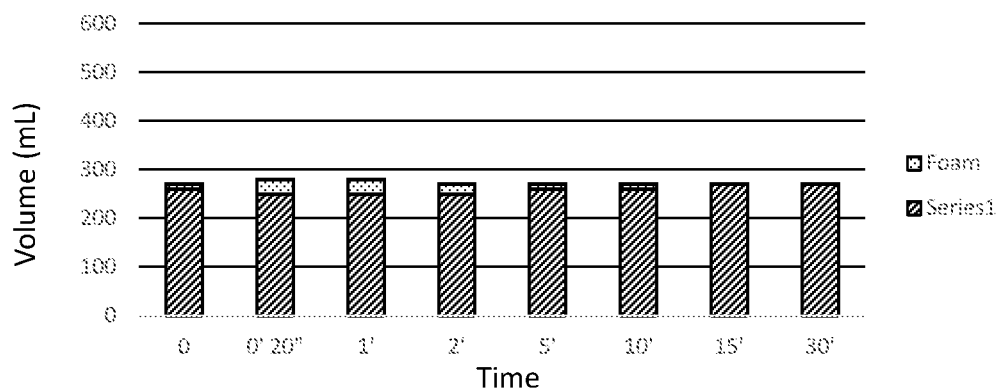

In Example 25, 230.6 g of whole milk and 36.0 g of coffee were mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 20 psi. The can was then opened and the beverage poured into the 500 mL beaker. The beverage separated into a liquid phase and a foam phase, which persisted for 13 minutes. The volume of the liquid phase and the foam phase over time is indicated below in Table 25. FIG. 36 is a graph of the volumes of the liquid phase and the foam phase of Example 25. The liquid phase had a viscosity of 750 cP. The most widespread bubbles in the foam phase had a diameter of 0.15 mm. The greatest volume of the foam phase was 30 mL, and the beverage stretched to a maximum volume of 10 mL above the initial volume of the beverage.

TABLE 25

Foam Duration of Example 25

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 260 | 250 | 250 | 250 | 260 | 260 | 270 | 270 |
| Foam (mL) | 10 | 30 | 30 | 20 | 10 | 10 | 0 | 0 |

Example 26

Figure 37:
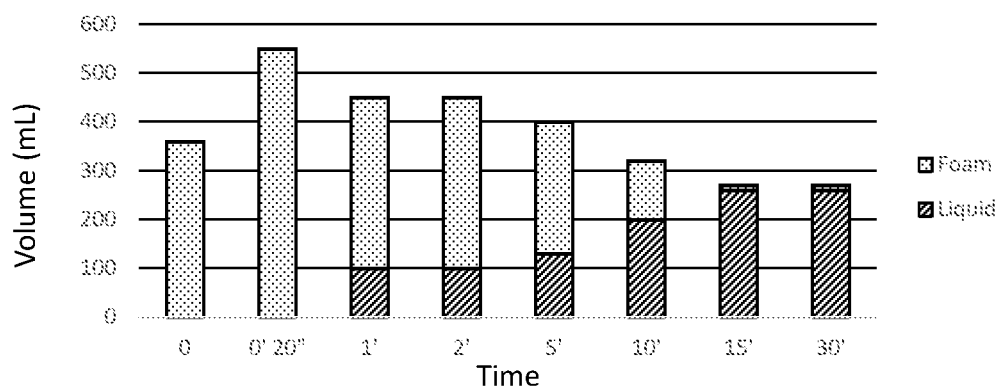

In Example 26, 230.6 g of whole milk and 36.0 g of coffee were mixed with 0.4 g of Gum A and 3.0 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for over 30 minutes. The volume of the liquid phase and the foam phase over time is indicated below in Table 26. FIG. 37 is a graph of the volumes of the liquid phase and the foam phase of Example 26. The liquid phase had a viscosity of 750 cP. The most widespread bubbles in the foam phase had a diameter of 0.1 mm. The greatest volume of the foam phase was 550 mL, and the beverage stretched to a maximum volume of 280 mL above the initial volume of the beverage.

TABLE 26

Foam Duration of Example 26

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 100 | 100 | 130 | 200 | 260 | 260 |
| Foam (mL) | 360 | 550 | 350 | 350 | 270 | 120 | 10 | 10 |

Example 27

Figure 38:
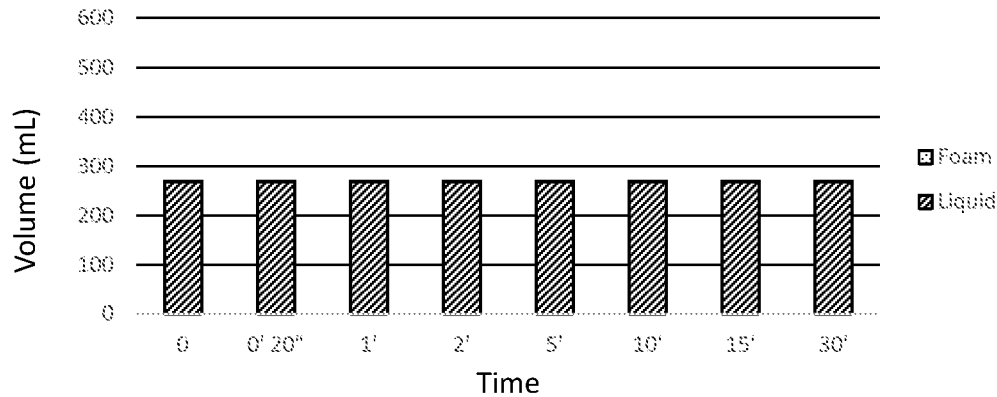

In Example 27, 230.6 g of whole milk and 36.0 g of coffee were mixed with 0.4 g of Gum A and 3.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. No foam phase formed in the beaker, and no amount of stretch was discernible to the naked eye. The volume of the liquid phase over time is indicated below in Table 27. FIG. 38 is a graph of the volumes of the liquid phase of Example 27. The liquid phase had a viscosity of 750 cP.

TABLE 27

Foam Duration of Example 27

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 270 | 270 | 270 | 270 | 270 | 270 | 270 | 270 |
| Foam (mL) | 0 | 0 | 0 | 0 | 0 | 0 | 0 | 0 |

Example 28

Figure 39:
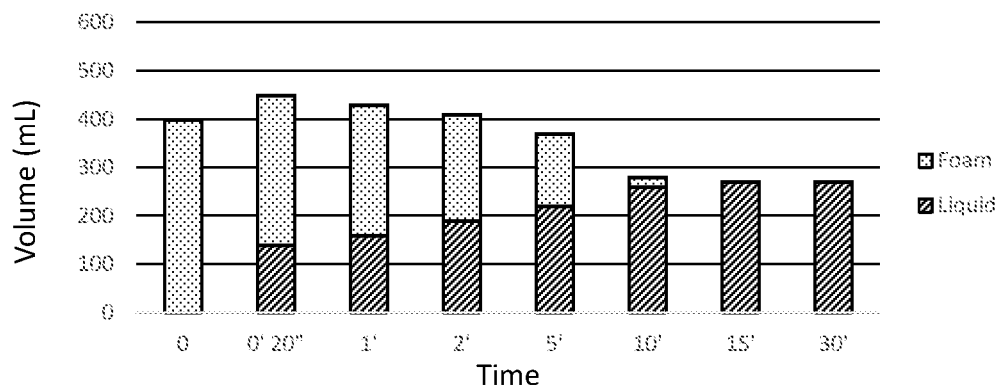

In Example 28, 230.6 g of whole milk and 36.0 g of coffee were mixed with 0.4 g of Gum A and 3.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for 11 minutes. The volume of the liquid phase and the foam phase over time is indicated below in Table 28. FIG. 39 is a graph of the volumes of the liquid phase and the foam phase of Example 28. The liquid phase had a viscosity of 750 cP. The most widespread bubbles in the foam phase had a diameter of 0.2 mm. The greatest volume of the foam phase was 400 mL, and the beverage stretched to a maximum volume of 180 mL above the initial volume of the beverage.

TABLE 28

Foam Duration of Example 28

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 140 | 160 | 190 | 220 | 260 | 270 | 270 |
| Foam (mL) | 400 | 310 | 270 | 220 | 150 | 20 | 0 | 0 |

Example 29

Figure 40:
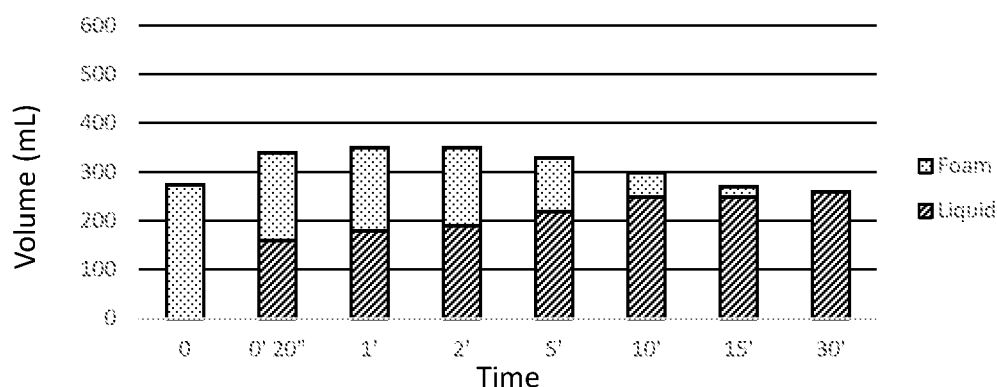

In Example 29, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 22 minutes. The volume of the liquid phase and the foam phase over time is indicated below in Table 29. FIG. 40 is a graph of the volumes of the liquid phase and the foam phase of Example 29. The liquid phase had a viscosity of 650 cP. The most widespread bubbles in the foam phase had a diameter of 0.5 mm. The greatest volume of the foam phase was 275 mL, and the beverage stretched to a maximum volume of 80 mL above the initial volume of the beverage.

TABLE 29

Foam Duration of Example 29

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 160 | 180 | 190 | 220 | 250 | 250 | 260 |
| Foam (mL) | 275 | 180 | 170 | 160 | 110 | 50 | 20 | 0 |

Example 30

Figure 41:
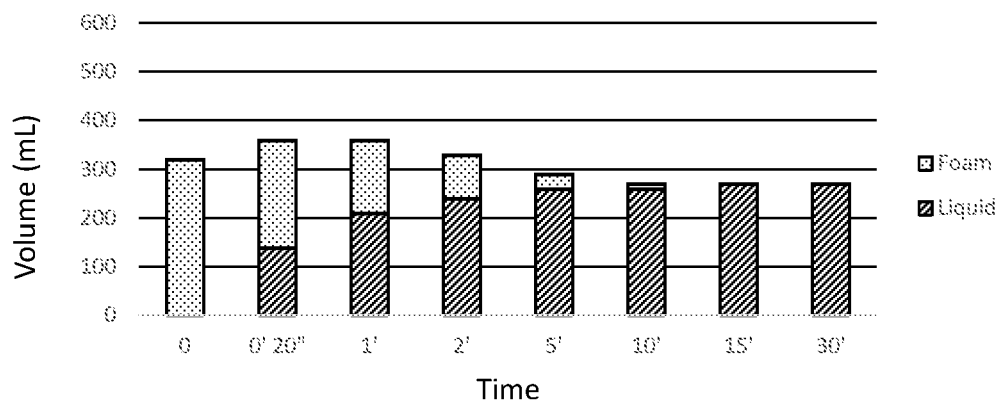

In Example 30, 214.0 g of whole milk, 48.0 g of coffee, and 8.0 g of cocoa and sugar were mixed and added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 12 minutes. The volume of the liquid phase and the foam phase over time is indicated below in Table 30. FIG. 41 is a graph of the volumes of the liquid phase and the foam phase of Example 30. The liquid phase had a viscosity of 100 cP. The most widespread bubbles in the foam phase had a diameter of 0.75 mm. The greatest volume of the foam phase was 320 mL, and the beverage stretched to a maximum volume of 90 mL above the initial volume of the beverage.

TABLE 30

Foam Duration of Example 30

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 140 | 210 | 240 | 260 | 260 | 270 | 270 |
| Foam (mL) | 320 | 220 | 150 | 90 | 30 | 10 | 0 | 0 |

Example 31

Figure 42:
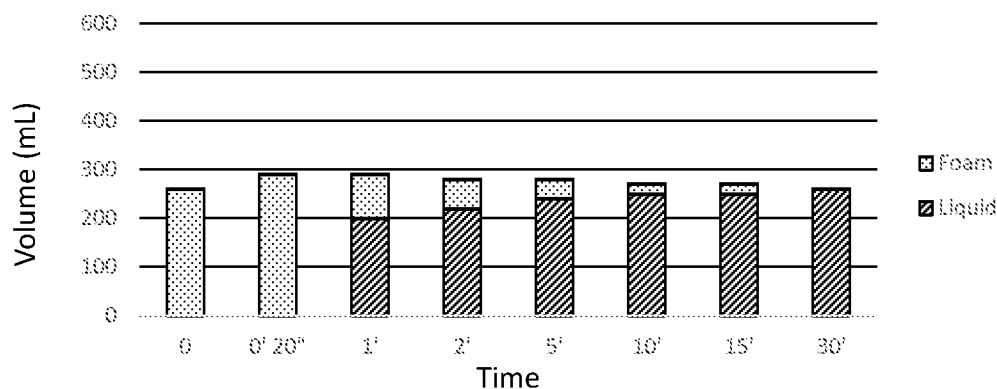

In Example 31, 210.0 g of whole milk, 46.6 g of coffee, and 6.0 g of cocoa and sugar were mixed with 0.6 g of Gum A and 6.8 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 26 minutes. The volume of the liquid phase and the foam phase over time is indicated below in Table 31. FIG. 42 is a graph of the volumes of the liquid phase and the foam phase of Example 31. The liquid phase had a viscosity of 2280 cP. The most widespread bubbles in the foam phase had a diameter of 0.05 mm. The greatest volume of the foam phase was 290 mL, and the beverage stretched to a maximum volume of 20 mL above the initial volume of the beverage.

TABLE 31

Foam Duration of Example 31

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 200 | 220 | 240 | 250 | 250 | 260 |
| Foam (mL) | 260 | 290 | 90 | 60 | 40 | 20 | 20 | 0 |

Example 32

Figure 43:
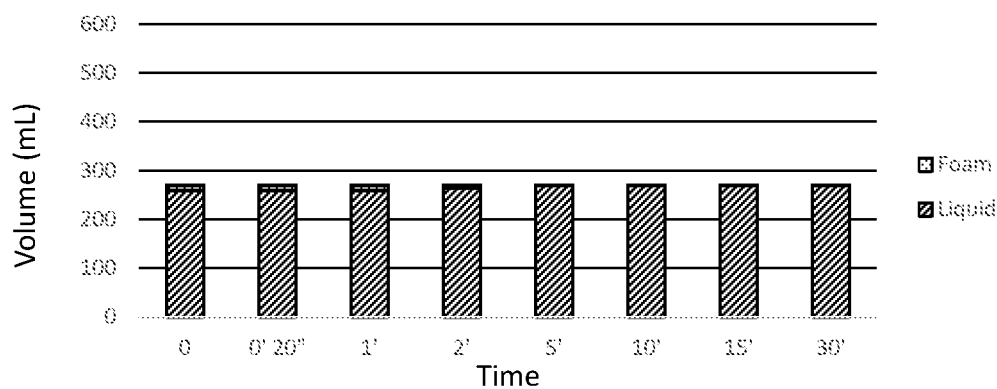

In Example 32, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 15 seconds at 9 Hz. After gassing and agitating the can, the final pressure inside the can was 10 psi. The can was then opened and the beverage poured into the 500 mL beaker. The beverage separated into a liquid phase and a foam phase, which persisted for only 3 minutes. The volume of the liquid phase and the foam phase over time is indicated below in Table 32. FIG. 43 is a graph of the volumes of the liquid phase and the foam phase of Example 32. The liquid phase had a viscosity of 650 cP. The most widespread bubbles in the foam phase had a diameter of 0.75 mm. The greatest volume of the foam phase was 10 mL, but no amount of stretch was discernible to the naked eye.

TABLE 32

Foam Duration of Example 32

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 260 | 260 | 260 | 265 | 270 | 270 | 270 | 270 |
| Foam (mL) | 10 | 10 | 10 | 5 | 0 | 0 | 0 | 0 |

Example 33

Figure 44:
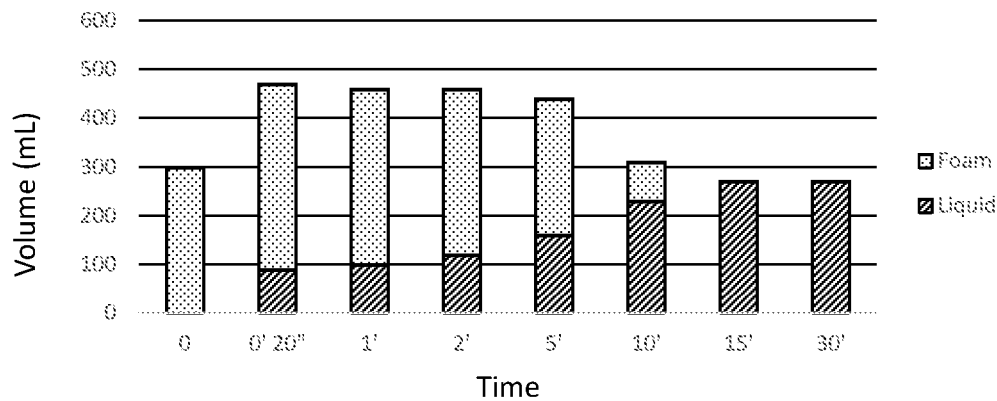

In Example 33, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for 14 minutes. The volume of the liquid phase and the foam phase over time is indicated below in Table 33. FIG. 44 is a graph of the volumes of the liquid phase and the foam phase of Example 33. The liquid phase had a viscosity of 650 cP. The most widespread bubbles in the foam phase had a diameter of 0.4 mm. The greatest volume of the foam phase was 380 mL, and the beverage stretched to a maximum volume of 200 mL above the initial volume of the beverage.

TABLE 33

Foam Duration of Example 33

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 90 | 100 | 120 | 160 | 230 | 270 | 270 |
| Foam (mL) | 300 | 380 | 360 | 340 | 280 | 80 | 0 | 0 |

Example 34

Figure 45:
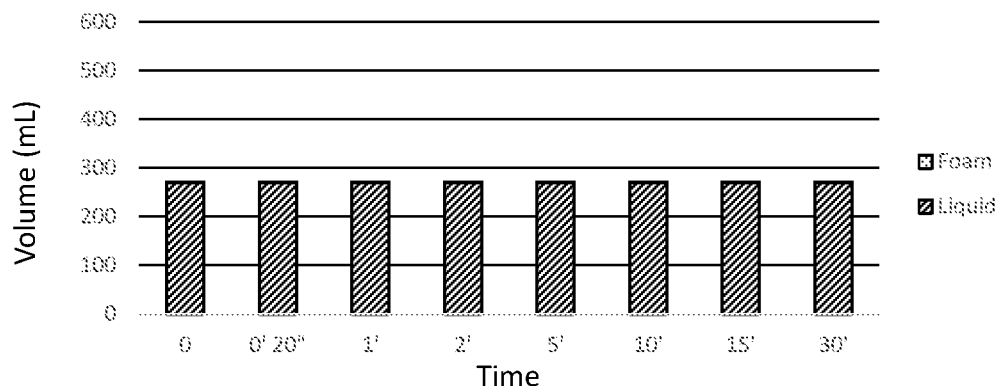

In Example 34, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. No foam phase formed in the beaker, and no amount of stretch was discernible to the naked eye. The volume of the liquid over time is indicated below in Table 34. FIG. 45 is a graph of the volumes of the liquid phase of Example 34. The liquid phase had a viscosity of 650 cP.

TABLE 34

Foam Duration of Example 34

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 270 | 270 | 270 | 270 | 270 | 270 | 270 | 270 |
| Foam (mL) | 0 | 0 | 0 | 0 | 0 | 0 | 0 | 0 |

Example 35

Figure 46:
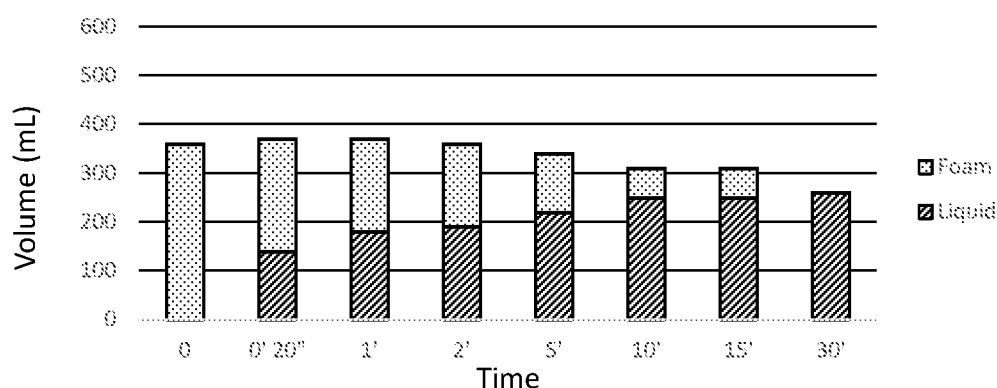

In Example 35, 212.0 g of whole milk, 47.3 g of coffee, and 7.0 g of cocoa and sugar were mixed with 0.3 g of Gum A and 3.4 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for 25 minutes. The volume of the liquid phase and the foam phase over time is indicated below in Table 35. FIG. 46 is a graph of the volumes of the liquid phase and the foam phase of Example 35. The liquid phase had a viscosity of 650 cP. The most widespread bubbles in the foam phase had a diameter of 0.2 mm. The greatest volume of the foam phase was 360 mL, and the beverage stretched to a maximum volume of 100 mL above the initial volume of the beverage.

TABLE 35

Foam Duration of Example 35

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 140 | 180 | 190 | 220 | 250 | 250 | 260 |
| Foam (mL) | 360 | 230 | 190 | 170 | 120 | 60 | 60 | 0 |

Example 36

Figure 47:
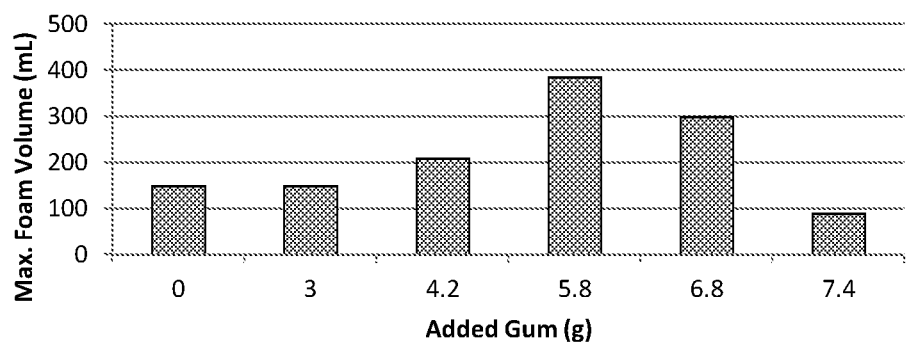

In Example 36, a number of additional beverages were produced with a mocha base having added levels of gum (i.e., mixtures of whole milk, coffee, chocolate, and sugar). As shown below in Table 36, beverages were produced with 0 g, 3.0 g, 4.2 g, 5.8 g, 6.8 g, and 7.4 grams of added gum. The beverages were added to a 9 fl. oz. can as described above. Nitrous oxide was added to the cans while agitating for 15 second at 9 Hz. After gassing and agitating the cans the final pressure inside the cans was 40 psi. Each can was then opened and the beverage poured into the 500 mL beaker. The volume of foam after 1 minute was measured for each beverage, as shown in Table 36 and FIG. 47.

TABLE 36

Foam Volumes of Example 36

| Added Gum (g) | Foam Volume after 1 minute (mL) |
|---|---|
| 0 | 150 |
| 3 | 150 |
| 4.2 | 210 |
| 5.8 | 385 |
| 6.8 | 300 |
| 7.4 | 90 |

Example 37

Figure 48:
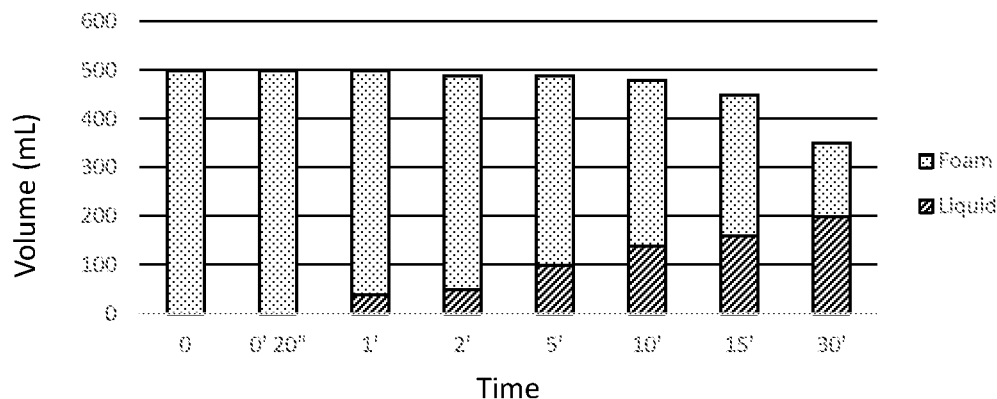

In Example 37, 265.5 g of orange juice was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for more than 30 minutes. The volume of the liquid phase and the foam phase over time is indicated below in Table 37. FIG. 48 is a graph of the volumes of the liquid phase and the foam phase of Example 37. The liquid phase had a viscosity of 1310 cP. The most widespread bubbles in the foam phase had a diameter of 0.1 mm. The greatest volume of the foam phase was 500 mL, and the beverage stretched to a maximum volume of 230 mL above the initial volume of the beverage.

TABLE 37

Foam Duration of Example 37

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 40 | 50 | 100 | 140 | 160 | 200 |
| Foam (mL) | 500 | 500 | 460 | 440 | 390 | 340 | 290 | 150 |

Example 38

Figure 49:
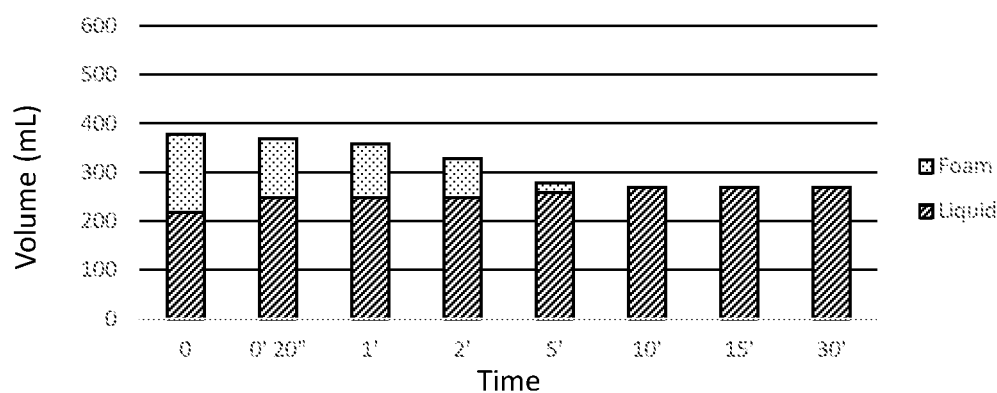

In Example 38, 270.0 g of orange juice was added to a 9 fl. oz. can as described above without the addition of any of Gum A or Gum B. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for 6 minutes. The volume of the liquid phase and the foam phase over time is indicated below in Table 38. FIG. 49 is a graph of the volumes of the liquid phase and the foam phase of Example 38. The liquid phase had a viscosity of 150 cP. The most widespread bubbles in the foam phase had a diameter of 0.8 mm. The greatest volume of the foam phase was 160 mL, and the beverage stretched to a maximum volume of 100 mL above the initial volume of the beverage.

TABLE 38

Foam Duration of Example 38

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 220 | 250 | 250 | 250 | 260 | 270 | 270 | 270 |
| Foam (mL) | 160 | 120 | 110 | 80 | 20 | 0 | 0 | 0 |

Example 39

Figure 50:
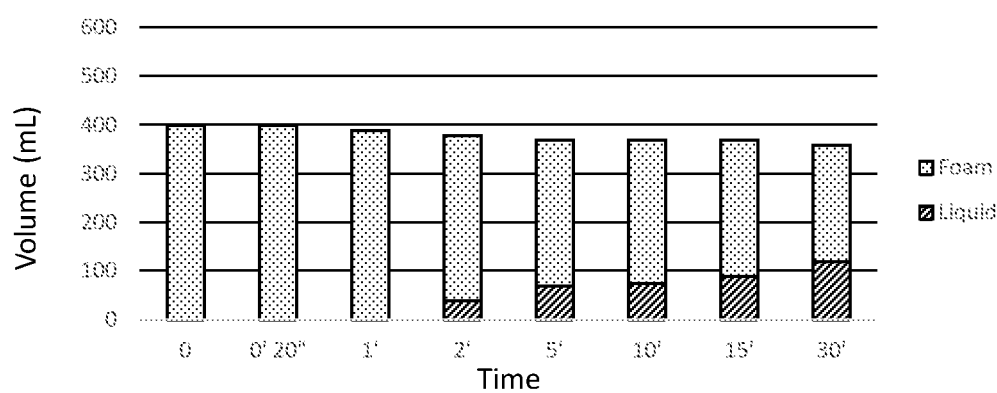

In Example 39, 261.0 g of orange juice was mixed with 1.0 g of Gum A and 8.0 g of Gum B and added to a 9 fl. oz. can as described above. Nitrous oxide was added to the can while agitating for 15 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 39. FIG. 50 is a graph of the volumes of the liquid phase and the foam phase of Example 39. The liquid phase had a viscosity of 2449 cP. The most widespread bubbles in the foam phase had a diameter of 0.1 mm. The greatest volume of the foam phase was 400 mL, and the beverage stretched to a maximum volume of 130 mL above the initial volume of the beverage.

TABLE 38

Foam Duration of Example 39

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 40 | 70 | 75 | 90 | 120 |
| Foam (mL) | 400 | 400 | 390 | 340 | 300 | 295 | 280 | 240 |

Example 40

Figure 51:
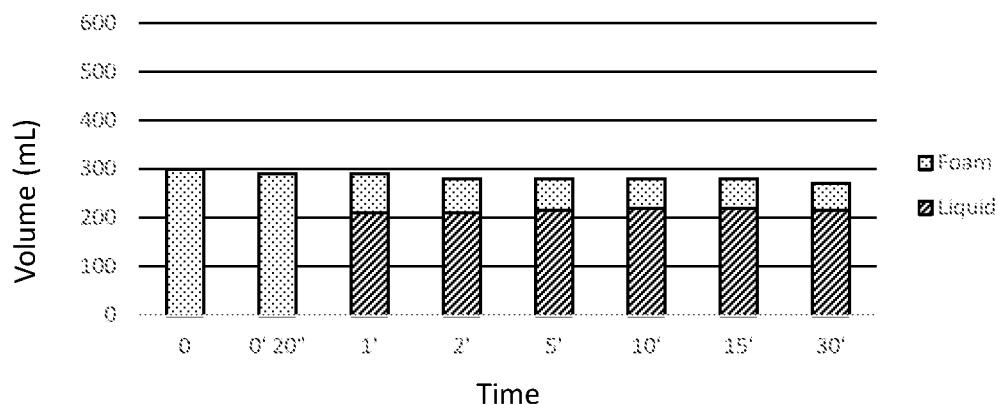

In Example 40, 265.5 g of orange juice was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 20 psi. The can was then opened and the beverage poured into the 500 mL beaker. The beverage separated into a liquid phase and a foam phase, which persisted for over 30 minutes. The volume of the liquid phase and the foam phase over time is indicated below in Table 40. FIG. 51 is a graph of the volumes of the liquid phase and the foam phase of Example 40. The liquid phase had a viscosity of 1310 cP. The most widespread bubbles in the foam phase had a diameter of 0.1 mm. The greatest volume of the foam phase was 300 mL, and the beverage stretched to a maximum volume of 30 mL above the initial volume of the beverage.

TABLE 39

Foam Duration of Example 40

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 210 | 210 | 215 | 220 | 220 | 215 |
| Foam (mL) | 300 | 290 | 80 | 70 | 65 | 60 | 60 | 55 |

Example 41

Figure 52:
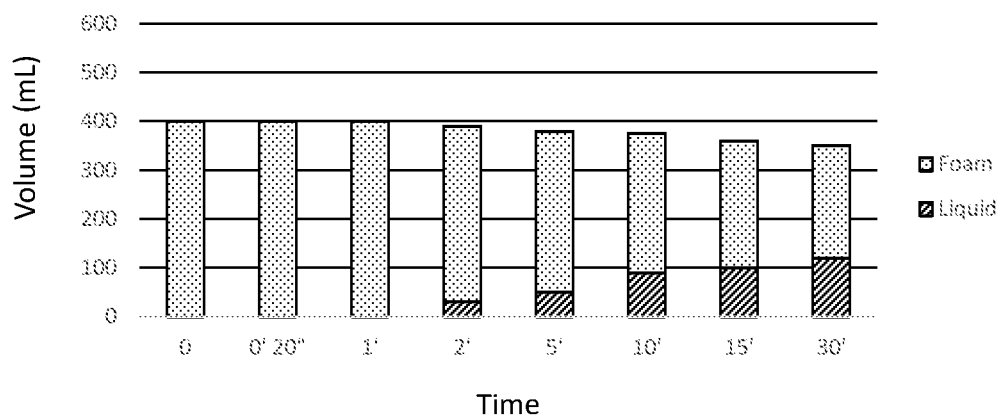

In Example 41, 265.5 g of orange juice was mixed with 0.5 g of Gum A and 4.0 g of Gum B and added to a 9 fl. oz. can as described above. Nitrous oxide was added to the can while agitating for 15 seconds at 9 Hz. After gassing and agitating the can, the final pressure inside the can was 60 psi. The can was then opened and the beverage poured into the 500 mL beaker. The beverage separated into a liquid phase and a foam phase, which persisted for over 30 minutes. The volume of the liquid phase and the foam phase over time is indicated below in Table 42. FIG. 52 is a graph of the volumes of the liquid phase and the foam phase of Example 41. The liquid phase had a viscosity of 1310 cP. The most widespread bubbles in the foam phase had a diameter of 0.3 mm. The greatest volume of the foam phase was 400 mL, and the beverage stretched to a maximum volume of 130 mL above the initial volume of the beverage.

TABLE 40

Foam Duration of Example 41

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 0 | 0 | 30 | 50 | 90 | 100 | 120 |
| Foam (mL) | 400 | 400 | 400 | 360 | 330 | 285 | 260 | 230 |

Example 42

Figure 53:
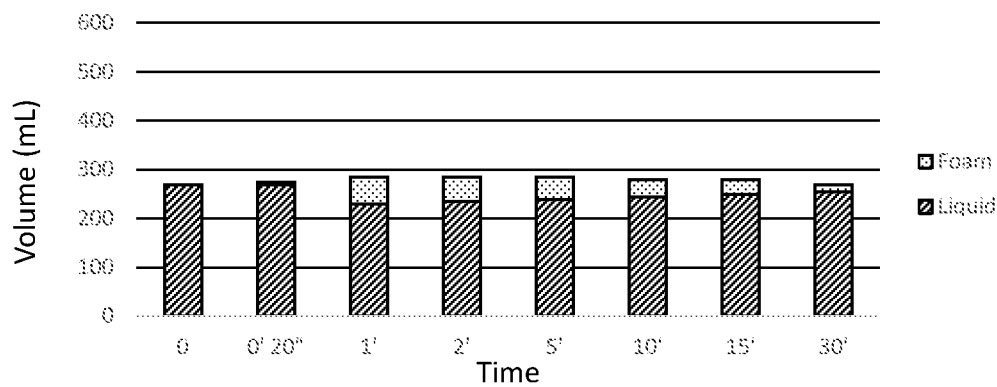

In Example 42, 265.5 g of orange juice was mixed with 0.5 g of Gum A and 4.0 g of Gum B and added to a 9 fl. oz. can as described above. Nitrous oxide was added to the can while agitating for 2 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 42. FIG. 53 is a graph of the volumes of the liquid phase and the foam phase of Example 42. The liquid phase had a viscosity of 1310 cP. The most widespread bubbles in the foam phase had a diameter of 0.4 mm. The greatest volume of the foam phase was 55 mL, and the beverage stretched to a maximum volume of 15 mL above the initial volume of the beverage.

TABLE 42

Foam Duration of Example 42

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 270 | 270 | 230 | 235 | 240 | 245 | 250 | 255 |
| Foam (mL) | 0 | 5 | 55 | 50 | 45 | 35 | 30 | 15 |

Example 43

Figure 54:
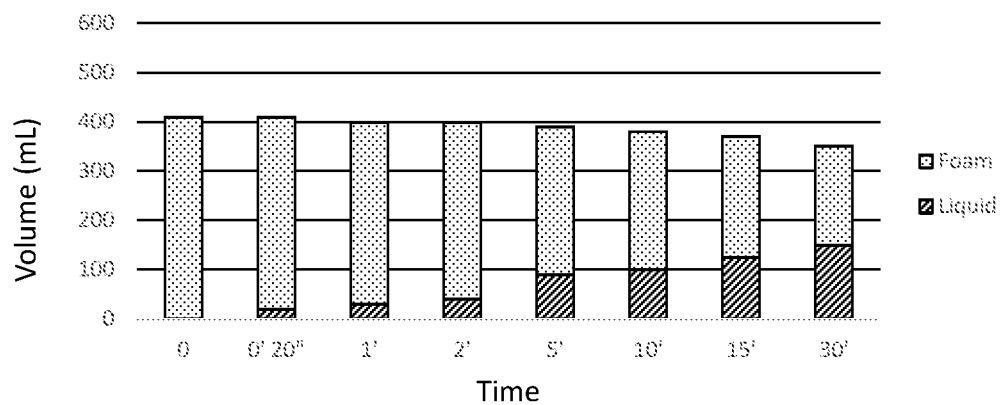

In Example 43, 265.5 g of orange juice was mixed with 0.5 g of Gum A and 4.0 g of Gum B and added to a 9 fl. oz. can as described above. Nitrous oxide was added to the can while agitating for 30 seconds at 9 Hz. After gassing and agitating the can, the final pressure inside the can was 40 psi. The can was then opened and the beverage poured into the 500 mL beaker. The beverage separated into a liquid phase and a foam phase, which persisted for over 30 minutes. The volume of the liquid phase and the foam phase over time is indicated below in Table 43. FIG. 54 is a graph of the volumes of the liquid phase and the foam phase of Example 43. The liquid phase had a viscosity of 1310 cP. The most widespread bubbles in the foam phase had a diameter of 0.2 mm. The greatest volume of the foam phase was 410 mL, and the beverage stretched to a maximum volume of 140 mL above the initial volume of the beverage.

TABLE 43

Foam Duration of Example 43

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 0 | 20 | 30 | 40 | 90 | 100 | 125 | 150 |
| Foam (mL) | 410 | 390 | 370 | 360 | 300 | 280 | 245 | 200 |

Example 44

Figure 55:
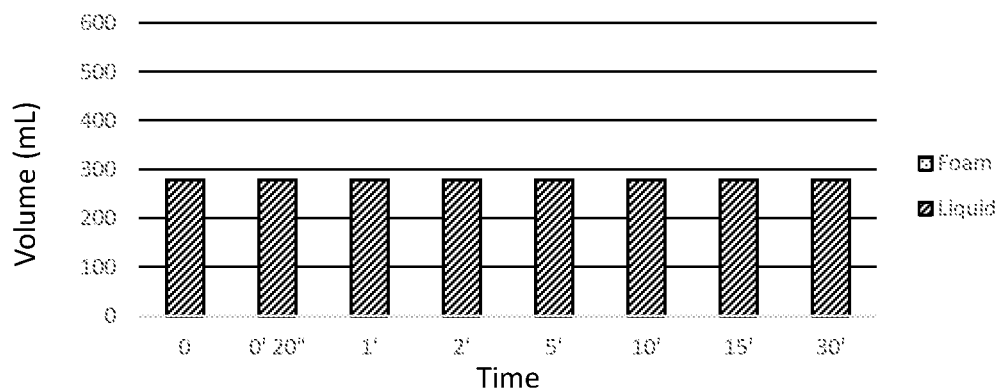

In Example 44, a Starbucks Frappuccino was opened and poured into a 500 mL beaker. The product was flat with no dissolved gas, and produced no foam when poured into the beaker. The volume of the liquid phase and the foam phase over time is indicated below in Table 44. FIG. 55 is a graph of the volumes of the liquid phase and the foam phase of Example 44.

TABLE 44

Foam Duration of Example 44

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 280 | 280 | 280 | 280 | 280 | 280 | 280 | 280 |
| Foam (mL) | 0 | 0 | 0 | 0 | 0 | 0 | 0 | 0 |

Example 45

Figure 56:
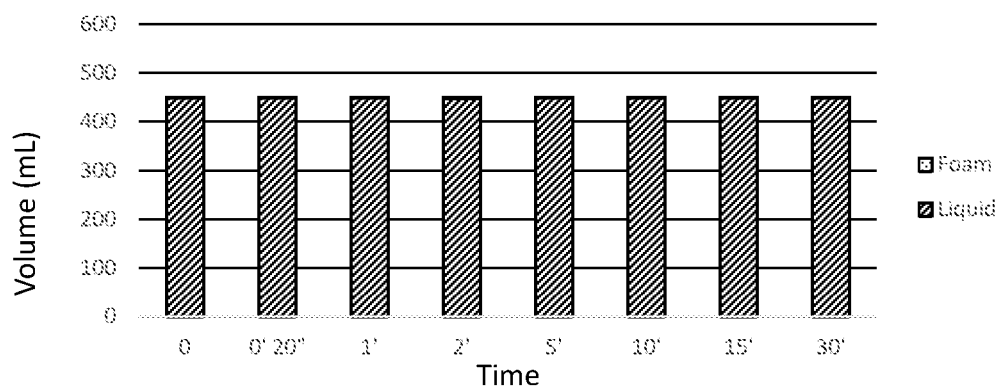
Figure 57:
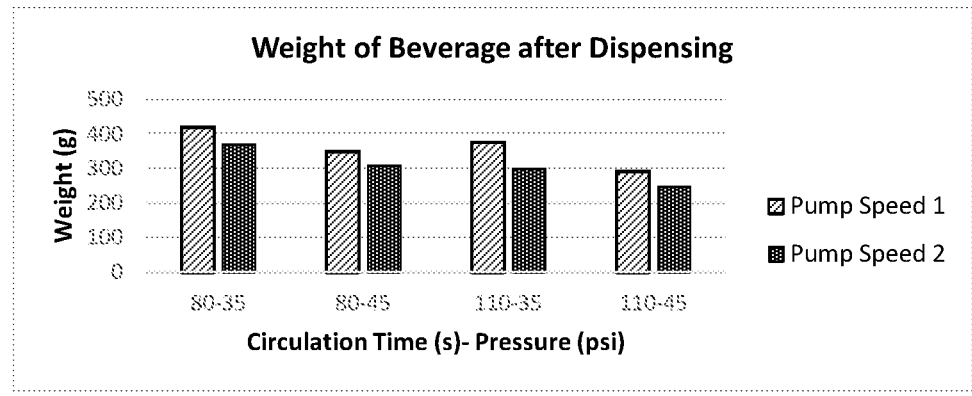
FIGS. 57-74 are graphs depicting the weight and volume of foam of beverages produced by a circulatory agitation system, according to exemplary embodiments of the invention.
Figure 58:
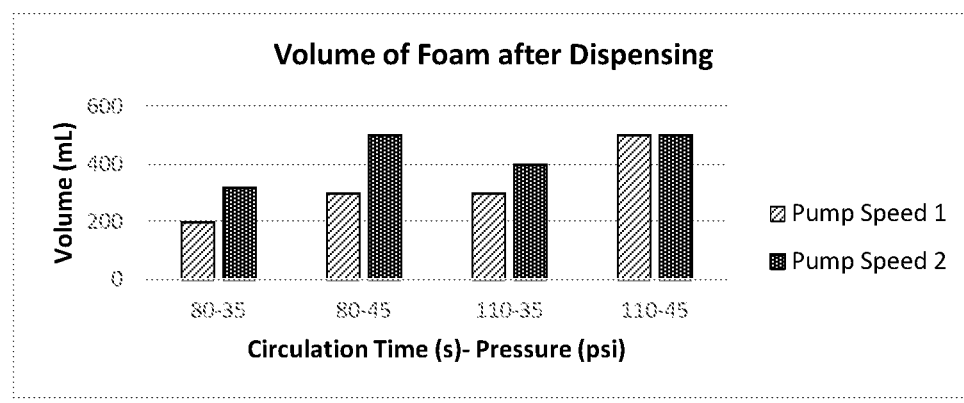
Figure 59:
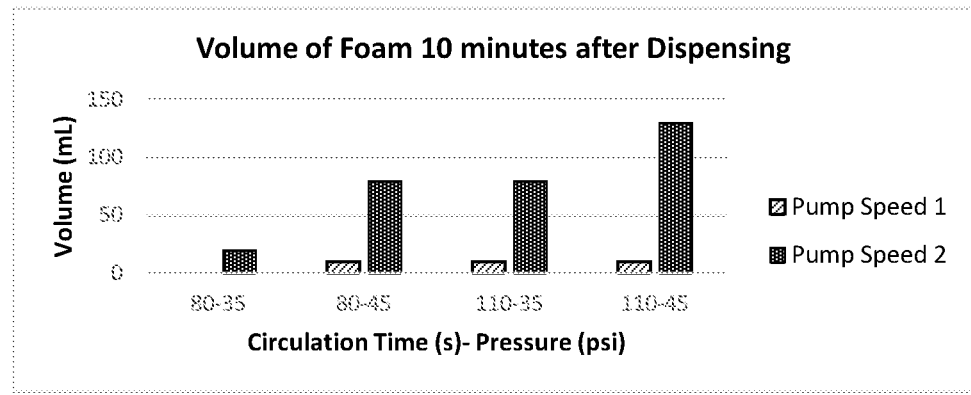
Figure 60:
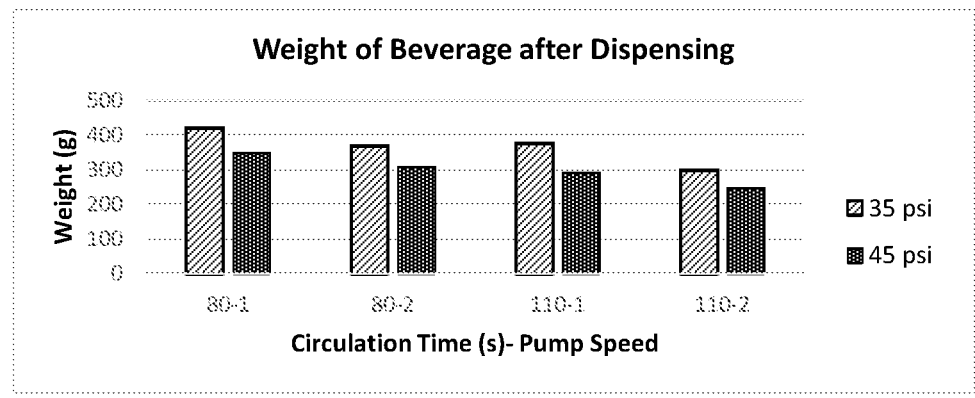
Figure 61:
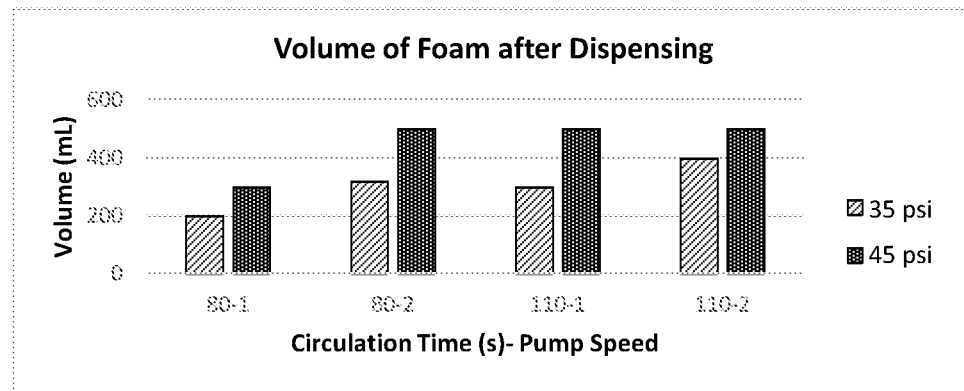
Figure 62:
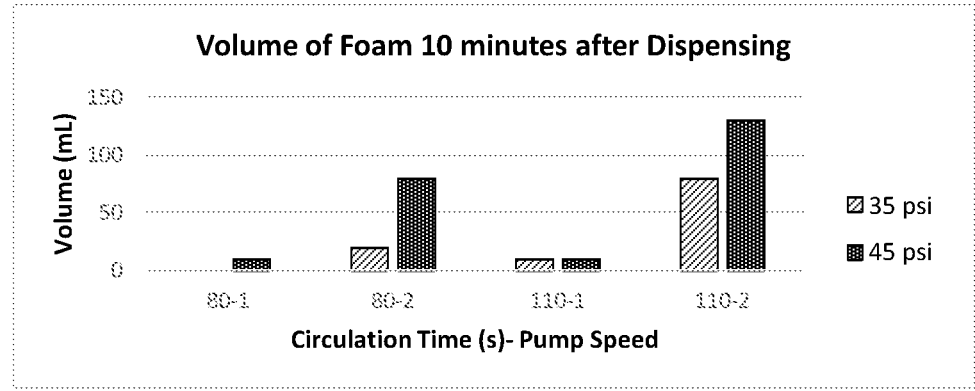
Figure 63:
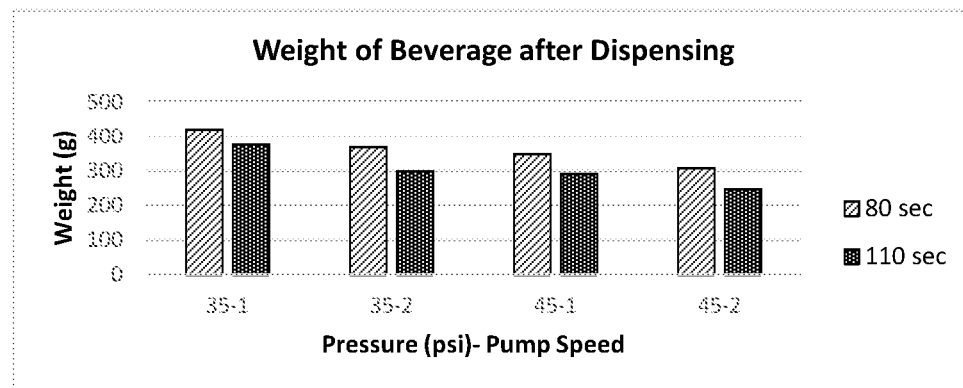
Figure 64:
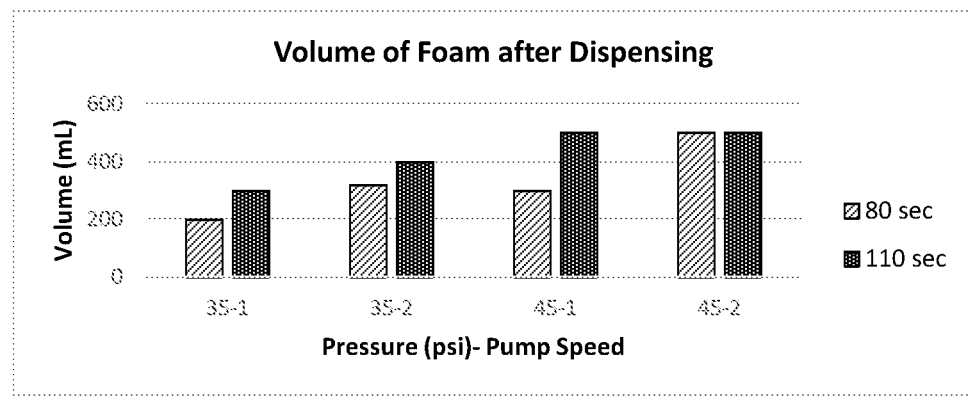
Figure 65:
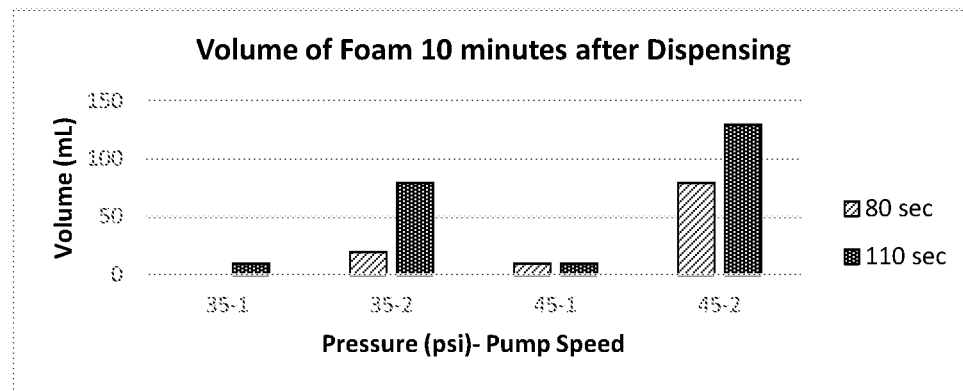
Figure 66:
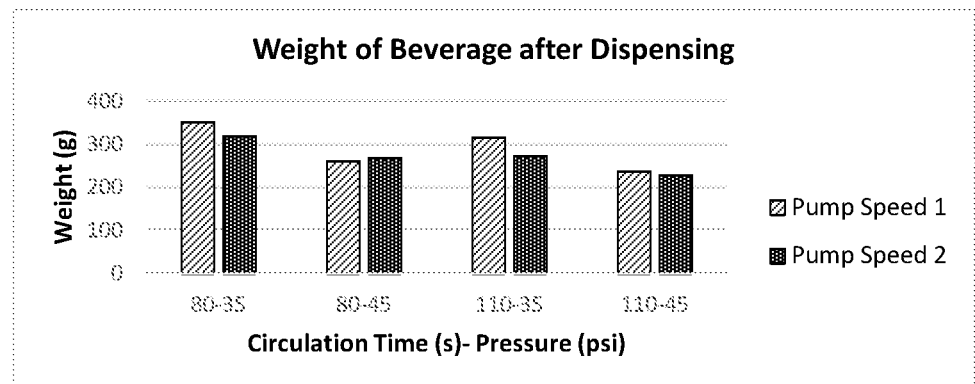
Figure 67:
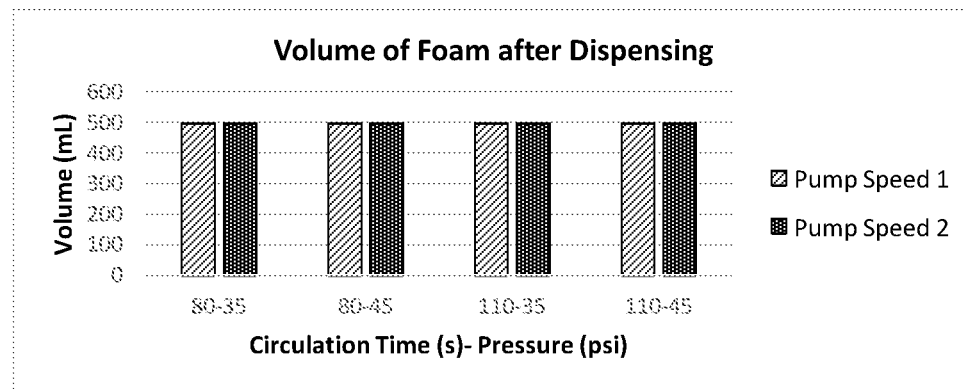
Figure 68:
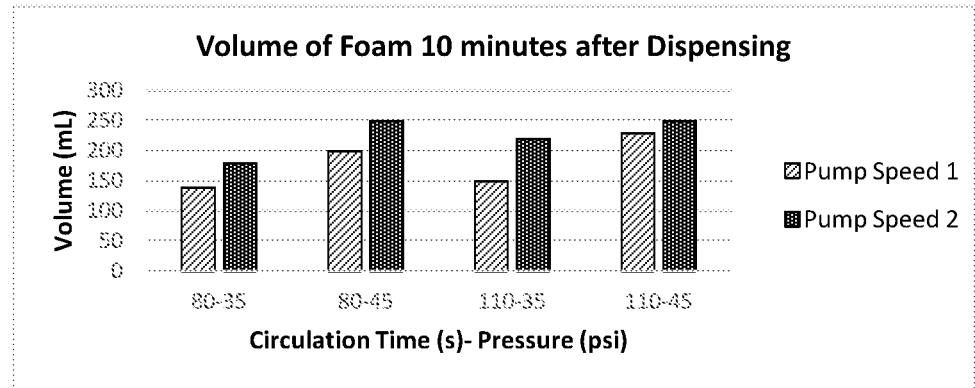
Figure 69:
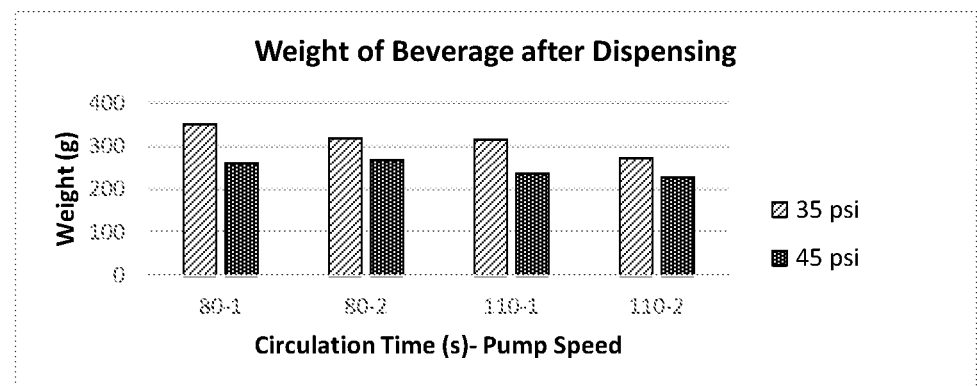
Figure 70:
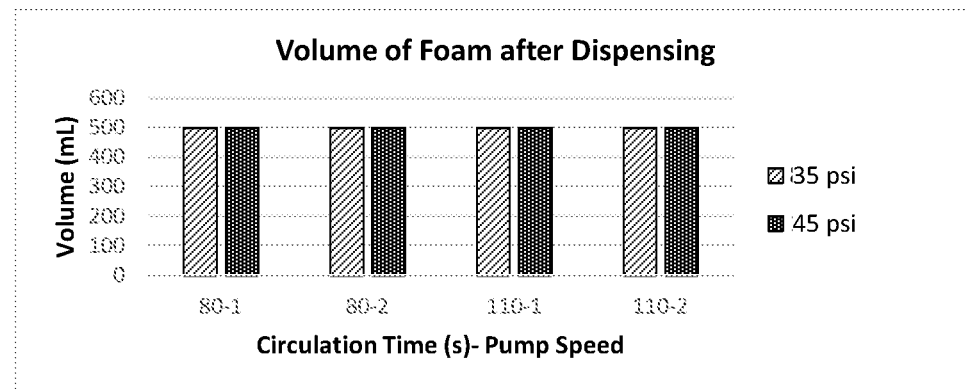
Figure 71:
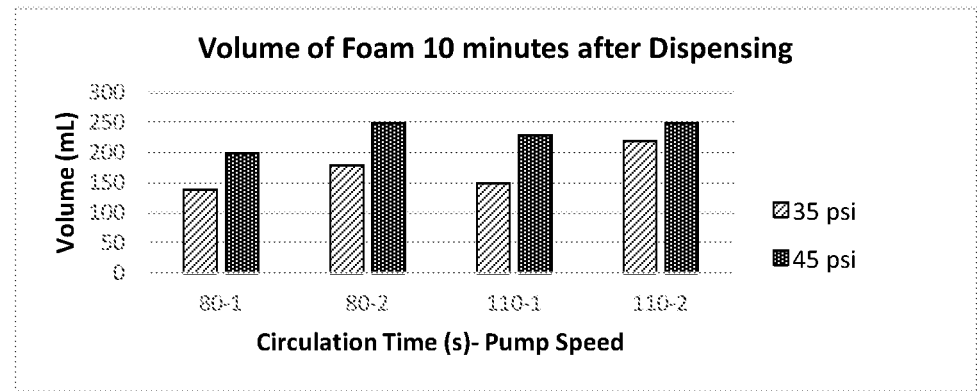
Figure 72:
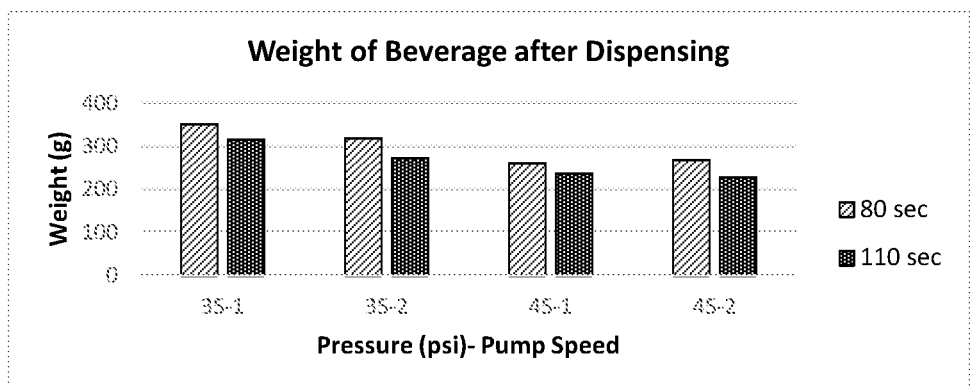
Figure 73:
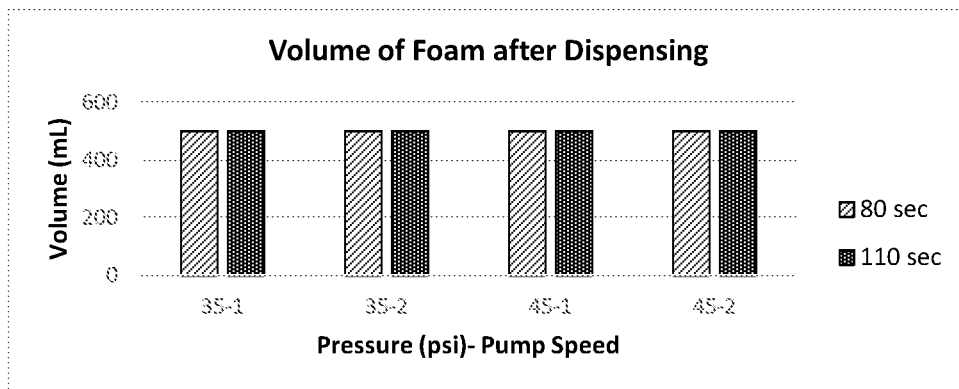
Figure 74:
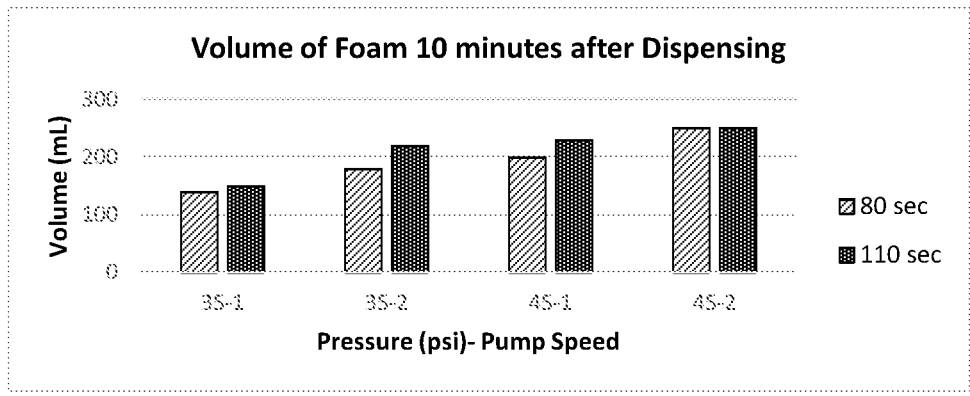

In Example 45, a Java Monster from Monster Energy The can was then opened and the beverage poured into the 500 mL beaker. Java Monster is a lightly carbonated product. A thin layer of foam appeared on the surface of the liquid two minutes after being poured into the beaker and rapidly disappeared. The volume of the liquid phase and the foam phase over time is indicated below in Table 45. FIG. 56 is a graph of the volumes of the liquid phase and the foam phase of Example 45.

TABLE 45

Foam Duration of Example 45

| | Time | | | | | | | |
|---|---|---|---|---|---|---|---|---|
| | 0 sec | 20 sec | 1 min | 2 min | 5 min | 10 min | 15 min | 30 min |
| Liquid (mL) | 450 | 450 | 450 | 449 | 450 | 450 | 450 | 450 |
| Foam (mL) | 0 | 0 | 0 | 1 | 0 | 0 | 0 | 0 |

Example 46

In Example 46, various beverages were prepared using a circulatory agitation system as described above in conjunction with FIGS. 9-11. A mixture of Acacia and Xanthan gum was added to either water or a mixture of milk and coffee and homogenizer from IKA Works, Inc. and a blender from Vita-Mix Corporation. The water mixture included 8.77 wt. % acacia gum (commercially available from Tic Gums, Inc. as Gum Arabic Spray Dry Powder), 1.07 wt. % of a mixture of acacia gum and xanthan gum (commercially available from Tic Gums, Inc. as Ticaloid 210 S Powder), and 90.16 wt. % water. The milk and coffee mixture included 0.14 wt. % acacia gum (commercially available from Tic Gums, Inc. as Gum Arabic Spray Dry Powder), 0.05 wt. % of a mixture of acacia gum and xanthan gum (commercially available from Tic Gums, Inc. as Ticaloid 210 S Powder), 16.64 wt. % cold brewed coffee, and 83.17 wt. % milk (2% milkfat). A 3 gallon cornelius keg was filled with 1.88 gallons of each mixture and connected to the circulatory agitation system and agitated under varying conditions by activating the pump to circulate the flat mixture between the keg and the pump (creating liquid pressure on the first side of the y-connector) and opening the gas storage container (creating gas pressure on the second side of the y-connector) for a designated period of time. Nitrous oxide was used to pressurize the liquid beverage. The pressure of the liquid is monitored by the speed of the pump used to circulate the liquid. The time of circulation, the gas pressure, and the pump speed were varied to observe the changes in the resulting product. Each variable was tested under two conditions. Time of circulation was either 80 seconds or 110 seconds for the water mixtures, or 80 seconds or 100 seconds for the coffee and milk mixtures. Gas pressure was either 35 psi or 45 psi. The pump used had a high speed of approximately 2.7 gallons per minute and a low speed of approximately 0.9 gallons per minute. The pump was unbranded diaphragm transfer pump from MoreFlavor of Pittsburgh, Calif. capable of operating between 0.8 gallons per minute and 3 gallons per minute. The high and low speeds were estimated according to the position of a non-graduated power knob which controlled the speed of the pump. As noted above, if the liquid pressure is too high relative to the pressure of the gas, gas would be unable to enter the y-connector resulting in no pressurization of the flat beverage. Conversely, if the gas pressure is too high relative to the pressure of the liquid, liquid will be unable to flow through the y-connector and the pump would cease to function due to a downstream buildup of liquid. The values chosen for each variable were chosen within working ranges which prevent either of these situations from occurring. Each combination of the three variables were tested for a total of eight experiments.

At the end of agitation, the keg was disconnected from the circulatory agitation system and attached to a dispensing system. A first 500 mL portion of the beverage was dispensed and discarded to purge the serving system and hoses of any remaining product from previous experiments. A second 500 mL portion was then dispensed into a beaker and weighed. A lower weight indicates that the dispensed beverage contains a larger amount of gas. The volume of foam was then measured immediately after serving, after 5 minutes, and after 10 minutes. The results of the experiments with the water and gum mixture are indicated below in Table 46, and the results of the experiments with the milk, coffee, and gum mixture are indicated below in Table 47.

TABLE 46

Circulatory Agitation System with Water

| Time of Circulation (s) | Gas Pressure (psi) | Pump Speed (High/Low) | Weight (g) | Foam Vol. after serving (mL) | Foam Vol. after 5 min. (mL) | Foam Vol. after 10 min. (mL) |
| --- | --- | --- | --- | --- | --- | --- |
| 80 | 35 | Low | 422 | 200 | 30 | 0 |
| 80 | 35 | High | 370 | 320 | 100 | 20 |
| 80 | 45 | Low | 349 | 300 | 100 | 10 |
| 80 | 45 | High | 309 | 500 | 180 | 80 |
| 110 | 35 | Low | 376 | 300 | 140 | 10 |
| 110 | 35 | High | 299 | 400 | 170 | 80 |
| 110 | 45 | Low | 291 | 500 | 150 | 10 |
| 110 | 45 | High | 248 | 500 | 240 | 130 |

TABLE 47 with Circulatory Agitation System with Milk and Coffee

| Time of Circulation (s) | Gas Pressure (psi) | Pump Speed (High/Low) | Weight (g) | Foam Vol. after serving (mL) | Foam Vol. after 5 min. (mL) | Foam Vol. after 10 min. (mL) |
| --- | --- | --- | --- | --- | --- | --- |
| 80 | 35 | Low | 352 | 500 | 250 | 140 |
| 80 | 35 | High | 319 | 500 | 270 | 180 |
| 80 | 45 | Low | 261 | 500 | 400 | 200 |
| 80 | 45 | High | 269 | 500 | 400 | 250 |
| 100 | 35 | Low | 316 | 500 | 300 | 150 |
| 100 | 35 | High | 274 | 500 | 300 | 220 |
| 100 | 45 | Low | 236 | 500 | 420 | 230 |
| 100 | 45 | High | 228 | 500 | 400 | 250 |

The results of the experiments of Example 46 are also depicted graphically in FIGS. 57-74. FIGS. 57-62 include the results of the experiments with the water and gum mixture, and FIGS. 63-74 include the results of experiments with the milk, coffee, and gum mixtures. As used in FIGS. 57-74, "Pump Speed 1" refers to the low speed and "Pump Speed 2" refers to the high speed.

CONCLUSIONS

As observed from Examples 1-45, the combination of gum, pressurization, and agitation is necessary to create a substantial amount of durable foam. All tests which included no gum (Examples 2, 9, 16, 23, 30, and 38), reduced pressure (Examples 4, 11, 18, 25, 32, and 40), or reduced agitation (Examples 6, 13, 20, 27, 34, and 42) showed a reduced amount of foam or foam duration when compared to the respective baseline test (Examples 1, 8, 15, 22, 29, and 37). Further, it is apparent that the method described herein will work with any liquid base. None of the test beverages (water (Examples 1-7), coffee (Examples 8-14), whole milk (Examples 15-21), latte (i.e., a mixture of coffee and milk) (Examples 22-28), mocha (i.e., a mixture of coffee, milk, cocoa, and sugar) (Examples 29-35), and orange juice (Examples 37-43)) failed to foam for at least one combination of variables.

The addition of gum to the base liquid serves at least three purposes. First, it thickens the base liquid in a way that may be more pleasing to drink. Second, once the container is opened, the gum traps the gas that exits the base liquid and forms bubbles. Although some of the test base liquids were sufficiently viscous to foam without the addition of gum, the foam phase duration was greatly increased by the gum. The gum further serves as a limiter on bubble size by forming a stronger, thicker bubble wall which resists stretching by the trapped gas. This results in finer bubbles which are perceived as silkier and creamier than foams with large bubbles.

Increasing the pressure inside the can produces more foam which persists for a longer period of time by increasing the volume of gas dissolved in the base liquid and available to produce bubbles. However, simply adding more gas alone is not sufficient to cause the gas to dissolve. As can be seen from the above examples, increasing the agitation time results in large increases in foam volume by causing a substantial increase in the volume of dissolved gas. Absent agitation, the gas injected into the container simply collects in the headspace and escapes the container once opened. Headspace gas cannot be trapped by the gum-supported bubbles and therefore does not result in foaming. In other words, the amount of dissolved gas in the liquid beverage is dependent on both the pressure inside the container and the degree of agitation. Low pressure, low agitation, or both will result in low amounts of dissolved gas. Increasing the pressure, agitation, or both will increase the amount of dissolved gas until the liquid beverage is saturated.

Accordingly, the production of foam is based on two factors: amount of gum and volume of dissolved gas. Each bubble can be considered a balloon which is inflated by the dissolved gas, but becomes harder to inflate as the balloon wall becomes thicker as a result of increased gum. Low amounts of dissolved gas results in a lack of foam because there is little gas to be trapped and the liquid lacks the ability to trap whatever gas is available. Low amounts of dissolved gas and high amounts gum leads to a slow cascading effect, but a low stretch and a weak microfoam. High amounts of dissolved gas and low amounts of gum leads to a dry foam which quickly stretches to large volumes. High amounts of dissolved gas and high amounts of gum lead to a medium stretch and a cascading effect which results in a strong and durable microfoam. However, there are levels beyond which additional gum is not beneficial, as illustrated by Example 36. Too much gum results in bubble walls which are too thick to be expanded by the dissolved gas, resulting in an overall decrease in the amount of gum. Optimal amounts of gum and dissolved gas will depend on the desired foam properties and the characteristics of the underlying base liquid. For example, base liquids which are more viscous will require lower amounts of gum in order to achieve the same effect.

Example 46 demonstrates the suitability of the circulatory agitation system for carrying out the method 100. Consistent with Examples 1-45, additional gas pressure, additional agitation (caused by a greater pump speed and/or a longer circulation time), or a combination of both resulted in a greater volume of dissolved gas, which subsequently results in a greater volume of foam and a longer foam duration. One of ordinary skill in the art would understand from this disclosure how to adjust these variables in order to achieve the desired foam quality and mouthfeel.

The foregoing description of exemplary embodiments of the invention should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A circulatory agitation system for the production of a pressurized beverage, the system comprising:
    a gas storage container including an outlet;
    a beverage storage container including an inlet and an outlet;
    a pump having an inlet and an outlet;
    a y-connector having a first inlet, a second inlet, and an outlet;
    a first conduit connecting the outlet of the gas storage container to the first inlet of a y connector;
    a second conduit connecting the outlet of the y-connector to the inlet of the beverage container;
    a third conduit connecting the outlet of the beverage container to the inlet of the pump; and
    a fourth conduit connecting the outlet of the pump to the second inlet of the y-connector,
    wherein a circular path is formed by the second conduit, the third conduit, and the fourth conduit and the circulatory path is adapted to permit a liquid to circulate between the beverage container the pump, and the y-connector.

2. The circulatory agitation system of claim 1, further comprising a refrigerator which holds the beverage container and the pump.

3. The circulatory agitation system of claim 1, wherein the beverage storage container contains a liquid beverage, and operating the pump causes liquid to circulate between the beverage storage container and the pump.

4. The circulatory agitation system of claim 3, wherein the gas storage container, the beverage storage container, and the pump form a sealed system which does not allow gas to escape.

5. The circulatory agitation system of claim 3 further comprising a valve and a pressure regulator adapted to control flow of gas between the gas storage container and the y-connector.

6. The circulatory agitation system of claim 5, wherein gas flowing from the gas storage container mixes in the y-connector with the liquid beverage circulating between the beverage storage container and the pump, resulting in gas dissolving in the liquid beverage.

7. The circulatory agitation system of claim 5, further comprising an electronic control system which controls the operation of the pump and the valve.

8. The circulatory agitation system of claim 7, wherein the electronic control system further provides power to the pump and the valve.

* * * * *